(12) United States Patent
Shibata et al.

(10) Patent No.: US 9,317,904 B2
(45) Date of Patent: Apr. 19, 2016

(54) IMAGE PROCESSING SYSTEM AND IMAGE PROCESSING METHOD

(71) Applicants: Takashi Shibata, Tokyo (JP); Akihiko Iketani, Tokyo (JP); Shuji Senda, Tokyo (JP)

(72) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/361,099

(22) PCT Filed: Dec. 10, 2012

(86) PCT No.: PCT/JP2012/082590
§ 371 (c)(1),
(2) Date: May 28, 2014

(87) PCT Pub. No.: WO2013/089261
PCT Pub. Date: Jun. 20, 2013

(65) Prior Publication Data
US 2015/0117762 A1    Apr. 30, 2015

(30) Foreign Application Priority Data

Dec. 12, 2011 (JP) ................. 2011-271529

(51) Int. Cl.
| | |
|---|---|
| *G06T 5/00* | (2006.01) |
| *G06T 7/00* | (2006.01) |
| *G06K 9/66* | (2006.01) |
| *G06T 5/50* | (2006.01) |
| *G06K 9/62* | (2006.01) |
| *H04N 19/97* | (2014.01) |
| *G06T 9/00* | (2006.01) |

(52) U.S. Cl.
CPC .............. *G06T 5/003* (2013.01); *G06K 9/6256* (2013.01); *G06K 9/66* (2013.01); *G06T 5/50* (2013.01); *G06T 7/003* (2013.01); *G06T 9/008* (2013.01); *H04N 19/97* (2014.11); *G06T 2207/20024* (2013.01); *G06T 2207/20081* (2013.01); *G06T 2207/20182* (2013.01); *G06T 2207/20201* (2013.01)

(58) Field of Classification Search
None
See application file for complete search history.

(56) References Cited

U.S. PATENT DOCUMENTS

| | | | |
|---|---|---|---|
| 2006/0115176 A1 | 6/2006 | Kanamori et al. | |
| 2012/0045095 A1* | 2/2012 | Tate et al. | 382/103 |

FOREIGN PATENT DOCUMENTS

| | | |
|---|---|---|
| JP | 2007-293912 A1 | 11/2007 |
| JP | 2008-234479 A1 | 10/2008 |
| JP | 2011-188478 A1 | 9/2011 |
| WO | WO-2005-122089 A1 | 12/2005 |

OTHER PUBLICATIONS

International Search Report Corresponding to PCT/JP2012/082590, Mar. 19, 2013, 1 page.

\* cited by examiner

*Primary Examiner* — David F Dunphy
(74) *Attorney, Agent, or Firm* — Wilmer Cutler Pickering Hale and Dorr LLP

(57) ABSTRACT

Provided is an image processing device that can bring about the sufficient resemblance between an original image and a restored image obtained corresponding to a low resolution input image. The image processing device includes a means that uses a dictionary for storing data associating deteriorated patches which are from a deteriorated image formed by deteriorating a prescribed image, and restoration patches which are from the prescribed image, and calculates, as a degree-of-similarity between plural input patches generated by dividing an input image and the deteriorated patches, a weighted degree-of-similarity between weighted deteriorated patches and weighted input patches, in which forms of the deteriorated patches and the input patches are reconfigured using a patch weight which is continuous weighting; a means that selects, on the basis of the weighted degree-of-similarity, a restoration patch for each input patch; and a means that combines the restoration patches to generate a restored image.

7 Claims, 24 Drawing Sheets

IMAGE PROCESSING SYSTEM AND IMAGE PROCESSING METHOD

CROSS-REFERENCE TO RELATED APPLICATIONS

The present application is a national stage application of International Application No. PCT/JP2010/082590 entitled "Image Processing system and Image Processing Method," filed on Dec. 10, 2012, which claims the benefit of priority from Japanese Patent Application No. JP2011-271529, filed on Dec. 12, 2011, the disclosures of which are incorporated herein in their entirety by reference thereto.

TECHNICAL FIELD

The present invention relates to an image processing system, an image processing method, and an image processing program which generate a restored image from a deteriorated image.

BACKGROUND ART

As an example of an art which generates a restored image from a deteriorated image, the super resolution art is known.

A method, which uses a dictionary created by learning a case in which a low resolution image and a high resolution image are associated each other, is called the learning type super resolution art in particular among the super resolution arts. Here, the dictionary is a dictionary which is created by learning the case in which the low resolution image and the high resolution image are associated each other.

An example of the learning type super resolution art is disclosed in a non-patent document 1. According to the learning type super resolution art which is disclosed in the non-patent document 1, the following method (here, referred to as a super resolution process) is carried out.

Firstly, the super resolution process receives an input image which is a low resolution image.

Moreover, the super resolution process generates a low frequency component from the input image.

The super resolution process cuts out a low frequency patch from the generated low frequency component, and calculates an amount of characteristics of low frequency on the basis is of the low frequency patch.

The super resolution process searches the dictionary for plural pieces of learning data on amount of characteristics of low frequency in an order of short distance which is from the calculated amount of characteristics of low frequency. Then, the super resolution process reads an amount of characteristics of high frequency which is associated with the searched learning data on amount of characteristics of low frequency.

Then, the super resolution process selects one amount of characteristics of high frequency on the basis of a distance when searching, consistency with the adjacent high frequency block, a concurrent probability of the amount of characteristics of low frequency and the amount of characteristics of high frequency which are learned separately in a learning step, or the like.

The art, which is described in the non-patent document 1, restrains a memory size, and makes a calculation cost reduced by adopting structure that the dictionary has one to many correspondence which means that plural amounts of characteristics of low frequency similar each other are grouped under one representative.

For example, a patent document 1 discloses an example of a super resolution apparatus.

The super resolution apparatus, which is described in the patent document 1, includes N times enlargement unit, a high pass filter unit, a patch extraction unit, an addition unit and a learning database.

The N times enlargement unit generates an enlargement image from a low resolution input image.

The high pass filter unit generates a middle frequency image from the enlargement image.

The patch extraction unit generates an estimation patch from the middle frequency image, a learning middle frequency patch, and a learning high frequency patch.

The addition unit generates an output image by adding the enlargement image and the estimation patch.

The learning database outputs the learning middle frequency patch and the learning high frequency patch.

The patent document 1 discloses that, in the above-mentioned super resolution apparatus, a process unit is not limited to a rectangular block, and may be in any form such as a circle, a polygon, or the like.

Patent Document

[Patent document 1] Japanese Patent Application Laid-Open No. 2011-188478

Non-patent Document

[Non-patent document 1] Taguchi, Ono, Mita and Ida "A Learning Method of Representative Example for Image Super-Resolution by Closed-Loop Training", The Transactions of the Institute of Electronics, Information and Communication Engineers D, information and systems J92-D(6), pp. 831-842, 2009-06-01

SUMMARY OF THE INVENTION

Problem to be Solved by the Invention

However, the arts, which are described in the patent document and the non-patent document, mentioned above, have a problem that it is not always possible to bring about sufficient resemblance between an original image and a restored image obtained correspondingly to the low resolution input image.

The reason is that, in the case that a patch of the restored image, which is corresponding to a patch of the low resolution input image, is selected from the learning data, a form of the patch, which is set at a discrete boundary, is defined as a basis of the process unit. That is, according to the art which is described in the non-patent document 1, a rectangular type low frequency patch, which is set at the discrete boundary, is defined as the process unit. Moreover, while the patent document 1 suggests that the process unit may have any form, but the super resolution apparatus merely processes the process unit of the rectangular block which has the discrete boundary. In other words, the super resolution apparatus discloses only the art of handling the rectangular block which has the discrete boundary and which a computer processes with ease. That is, the patent document 1 does not disclose an art that a computer or a hardware apparatus processes a patch which has a form other than the rectangular block.

The low resolution input image which is input, and the low resolution image which is associated with the high resolution image in the learning data are changed and dispersed so that information on the high resolution image corresponding to the low resolution image cannot be recognized correctly.

Accordingly, it is impossible to obtain information which is a basis for determining a form and a size of the optimum process unit.

In the case that the process unit is set by use of the discrete boundary in this situation, there is a possibility that information included in the process unit of the low resolution image may be as follows. Firstly, information (necessary information), which exists outside the process unit of the low resolution image (not included in the process unit) and which is included in the process unit of the high resolution image corresponding to the process unit of the low resolution image, is lacked completely. Secondly, information (unnecessary information), which exists inside the process unit of the low resolution image (included in the process unit) and which is included in the process unit of the high resolution image not corresponding to the process unit of the low resolution image, intermingles without exception.

An object of the present invention is to provide an image processing system, an image processing method, and an image processing program which solve the problem mentioned above.

Means for Solving a Problem

An image processing device according to one aspect of the present invention includes a degree-of-similarity calculation means for using a dictionary for storing data of plural pairs associating deteriorated patches which are patches from a deteriorated image formed by deteriorating a prescribed image, and restoration patches which are patches from said prescribed image, and calculating, as a degree of similarity between plural input patches generated by dividing an input image which is input and said deteriorated patches, a weighted degree-of-similarity which is a degree-of-similarity between weighted deteriorated patches and weighted input patches in which forms of said deteriorated patches and said input patches are reconfigured using a patch weight which is continuous weight, a selection means for selecting, on the basis of said weighted degree-of-similarity, a restoration patch for each input patch, and a combination means for combining said restoration patches, each of which is selected for each input patch, to generate a restored image.

An image processing method according to one aspect of the present invention which a computer executes which includes using a dictionary for storing data of plural pairs associating deteriorated patches which are patches from a deteriorated image formed by deteriorating a prescribed image, and restoration patches which are patches from said prescribed image, calculating, as a degree of similarity between plural input patches generated by dividing an input image which is input and said deteriorated patches, a weighted degree-of-similarity which is a degree-of-similarity between weighted deteriorated patches and weighted input patches in which forms of said deteriorated patches and said input patches are reconfigured using a patch weight which is continuous weight, selecting, on the basis of said weighted degree-of-similarity, a restoration patch for each input patch, and combining said restoration patches, each of which is selected for each input patch, to generate a restored image.

A non-volatile recording medium according to one aspect of the present invention recording an image processing program which makes a computer execute:

a process of using a dictionary for storing data of plural pairs associating deteriorated patches which are patches from a deteriorated image formed by deteriorating a prescribed image, and restoration patches which are patches from the prescribed image, and calculating, as a degree of similarity between plural input patches generated by dividing an input image which is input and said deteriorated patches, a weighted degree-of-similarity which is a degree-of-similarity between weighted deteriorated patches and weighted input patches in which forms of said deteriorated patches and said input patches are reconfigured using a patch weight which is continuous weight;

a process of selecting, on the basis of said weighted degree-of-similarity, a restoration patch for each input patch; and a process of combining said restoration patches, each of which is selected for each input patch, to generate a restored image.

Effect of the Invention

The present invention includes an effect that it is possible to bring about the sufficient resemblance between the original image and the restored image which is obtained correspondingly to the low resolution input image.

EXEMPLARY EMBODIMENTS FOR CARRYING OUT OF THE INVENTION

Next, an exemplary embodiment for carrying out the present invention will be described in detail with reference to a drawing.

First, in order to make the exemplary embodiment of the present invention understood with ease, a background of the present invention will be described. Here, while the super resolution art will be exemplified in the following description, the present invention is not limited to being applied to the super resolution art. For example, the present invention is applicable to all arts, which generate a restored image from an input image having poor quality, such as the noise removing art, the image restoring art, the time-domain resolution interpolating art, the blur removing art, or the like.

The learning type super resolution art has a learning phase and a restoration phase.

The learning phase is a phase of learning a plurality of cases and creating a dictionary which includes a patch pair of each case as dictionary data.

The restoration phase is a phase of searching for the optimum patch corresponding to a patch of an input image (hereinafter, referred to as input patch), which is a target of the image processing, on the basis of the dictionary which is created in the learning phase, and generating a super resolution image (restored image) in a combination process. Here, a general input image is an image with poor quality such as a low resolution image, an image intermingled with noise, an image destroyed partially or an image lacked partially.

Here, the patch pair means a pair of a patch of a high resolution image, and a patch of a low resolution image in a predetermined case. The high resolution image (hereinafter, referred to as a learning image) means a high resolution image corresponding to the case. The low resolution image (hereinafter, referred to as a deteriorated image) means an image which is formed by deteriorating the high resolution image. Hereinafter, a patch of the learning image (high resolution image), a patch of the deteriorated image (low resolution image) are called a restoration patch and a deteriorated patch respectively. Moreover, the patch means a partial and small area image included in a target image. For example, the patch is generated by dividing the target image into blocks.

<First Exemplary Embodiment>

Figure 1:
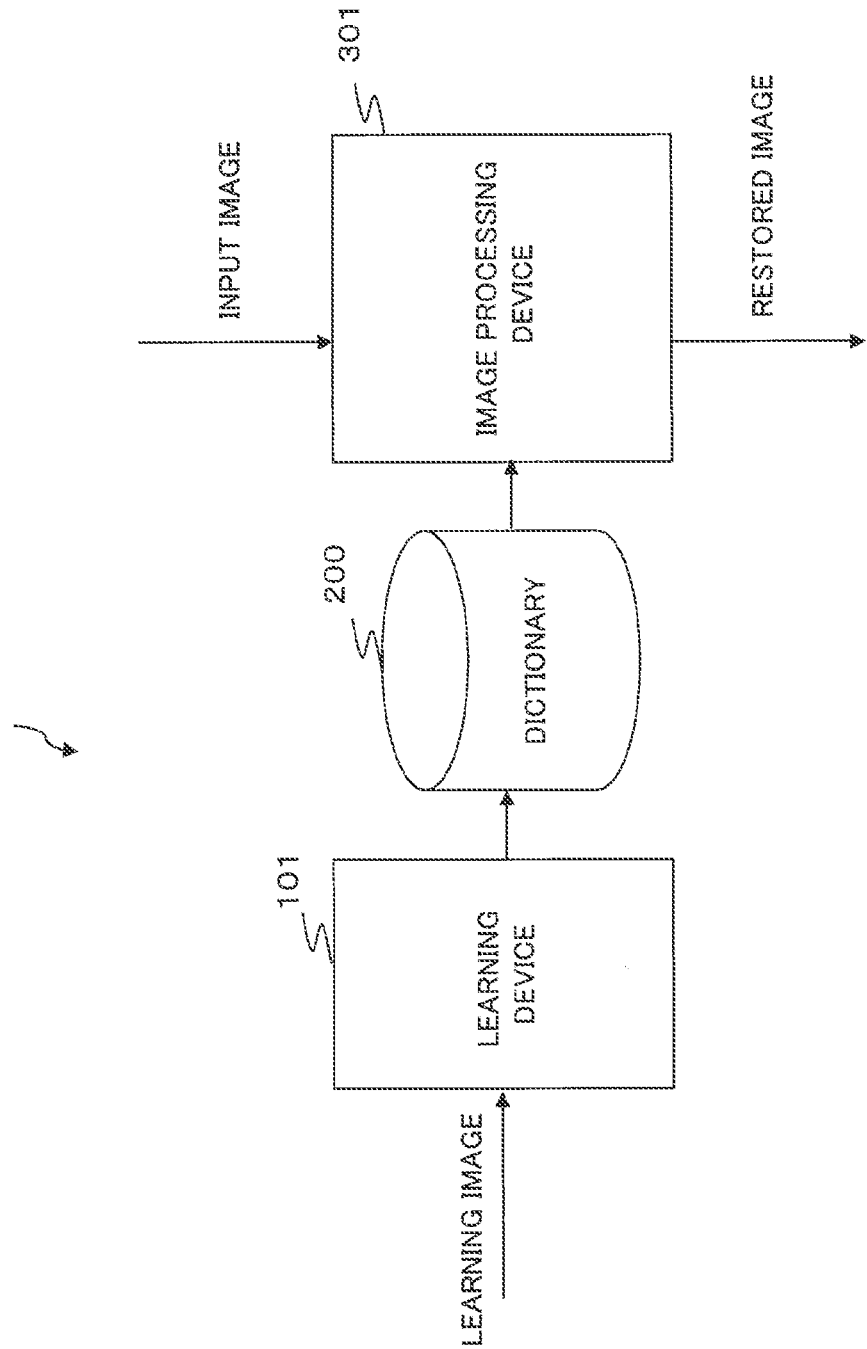
FIG. 1 is a block diagram showing a configuration of an image processing system according to a first exemplary embodiment.

FIG. 1 is a block diagram showing a configuration of an image processing system 1000 according to a first exemplary embodiment.

As shown in FIG. 1, the image processing system 1000 according to the first exemplary embodiment includes a learning device 101, a dictionary 200 and an image processing device 301. The learning device 101 receives the learning image and carries out the learning phase. The dictionary 200 stores the patch pair which is generated in the learning phase. The image processing device 301 receives the input image, carries out the restoration phase with using the dictionary 200, and outputs the restored image.

Hereinafter, the learning phase and the restoration phase of the exemplary embodiment will be described separately.

(Learning Phase)

The learning phase in the first exemplary embodiment will be described with reference to FIGS. 2 to 5.

Figure 2:
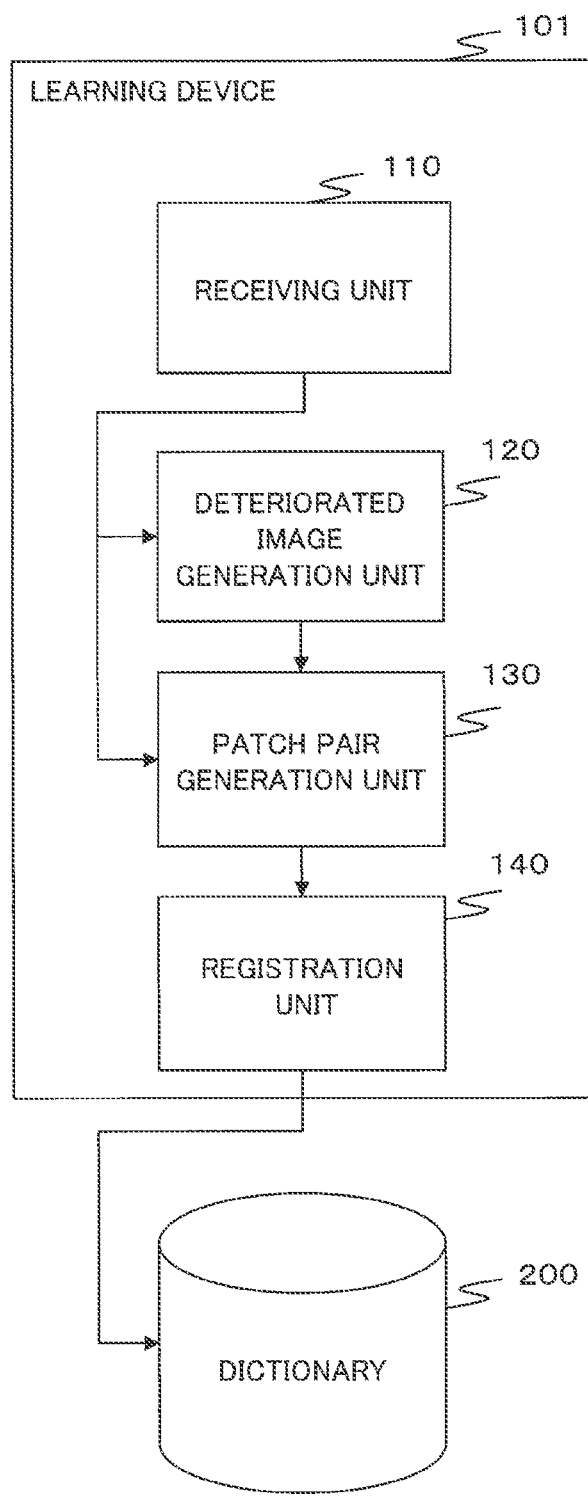
FIG. 2 is a block diagram showing a configuration of a learning device in the first exemplary embodiment.

FIG. 2 is a block diagram showing a configuration of the learning device 101. As shown in FIG. 2, the learning device 101 includes a receiving unit 110, a deteriorated image generation unit 120, a patch pair generation unit 130, and a registration unit 140.

The learning device 101 creates the dictionary 200 by carrying out the learning phase.

The receiving unit 110 receives the learning image from the outside. The receiving unit 110 outputs the learning image, which is received from the outside, to the deteriorated image generation unit 120 and the patch pair generation unit 130.

The deteriorated image generation unit 120 carries out a deteriorating process to the learning image, which the receiving unit 110 outputs, to generate the deteriorated image.

The deteriorated image generation unit 120 may carry out the plural deteriorating processes to the learning image, which the receiving unit 110 outputs, to generate a plurality of deteriorated images. The deteriorated image generation unit 120 may carry out the plural and different deteriorating processes to the learning image to generate a plurality of deteriorated images.

The deteriorated image generation unit 120 may generate the deteriorated image by carrying out at least one out of processes of size reduction, brightness decrease, high frequency component removal, and posture change to the learning image which the receiving unit 110 outputs.

The deteriorated image generation unit 120 may generate the deteriorated image by reducing a size of the learning image, which is received from the receiving unit 110, to, for example, 1 over N of the size. As an algorithm for reducing the image size, for example, the nearest neighbor method, which causes relatively-large image deterioration, is used. Moreover, as the algorithm for reducing the image size, for example, the bilinear method or the bi-cubic method may be used.

The deteriorated image generation unit 120 may generate the deteriorated image by strengthening a degree of blur, for example, by removing a high frequency component of the learning image. The deteriorated image generation unit 120 may generate the deteriorated image by making the learning image slant to change the posture. Alternatively, the deteriorated image generation unit 120 may generate the deteriorated image by decreasing a value of luminance of the learning image to decrease a degree of the brightness. The deteriorated image generation unit 120 may generate the deteriorated image with various existing methods.

The deteriorated image generation unit 120 outputs the deteriorated image, which is generated from the learning image, to the patch pair generation unit 130.

The patch pair generation unit 130 receives the learning image from the receiving unit 110, and receives a deteriorated image of the learning image from the deteriorated image generation unit 120. The patch pair generation unit 130 generates a plurality of patch pairs each of which includes a patch of the learning image and a patch of the deteriorated image which are arranged at positions corresponding to each other.

It is enough that the patch pair generation unit 130 may generate a plurality of pairs (patch pairs), each of which includes the restoration patch and the deteriorated patch, with the existing method.

The patch pair generation unit 130 outputs the generated plural patch pairs to the registration unit 140.

Here, the receiving unit 110 of the learning device 101 may receive both of the learning image and the deteriorated image, which is included in the pair including the learning image, from the outside. For example, the learning image is an image photographed by a camera which can photograph a high resolution image, and the deteriorated image is an image photographed by a low performance camera. Moreover, the deteriorated image may be an image which is photographed with making a camera out of focus intentionally, or with setting a wrong exposure time purposely. Moreover, the deteriorated image may be an image which is photographed with making a camera moved. Furthermore, the deteriorated image may be an image which is photographed under every bad condition. In this case, the learning device 101 may not include the deteriorated image generation unit 120. Moreover, the patch pair generation unit 130 receives the learning image and the deteriorated image from the receiving unit 110.

The registration unit 140 receives a plurality of the patch pairs from the patch pair generation unit 130. The registration unit 140 registers a plurality of the patch pairs with the dictionary 200.

The dictionary 200 stores a plurality of the patch pairs which are generated by the learning device 101.

Figure 3:
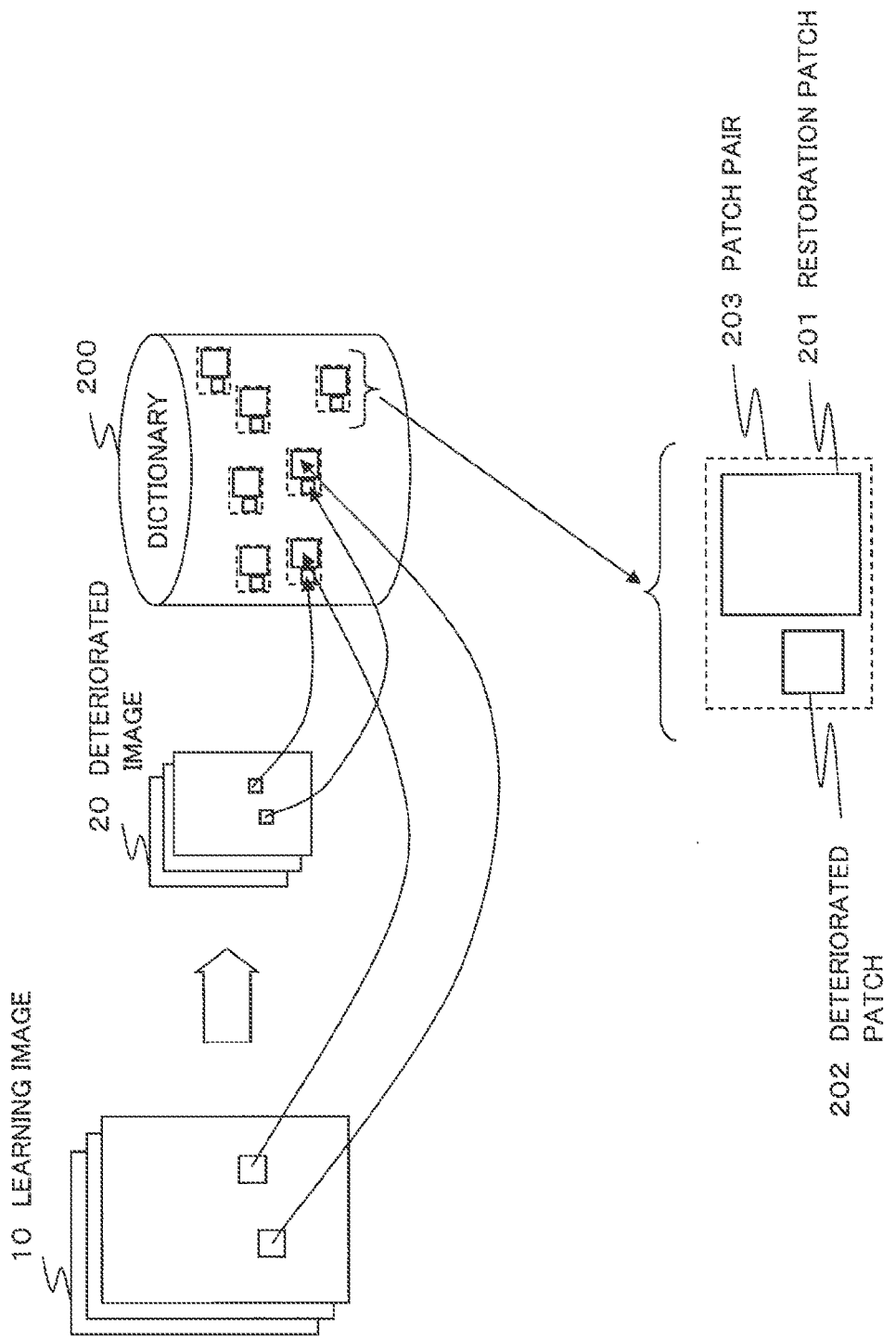
FIG. 3 is a conceptual diagram showing a learning phase in the first exemplary embodiment.

FIG. 3 is a conceptual diagram showing the learning phase. As shown in FIG. 3, the learning device 101 registers the patch pair, which includes a patch of a learning image 10 and a patch of a deteriorated image 20 which are arranged at positions corresponding each other, with the dictionary 200.

Figure 4:
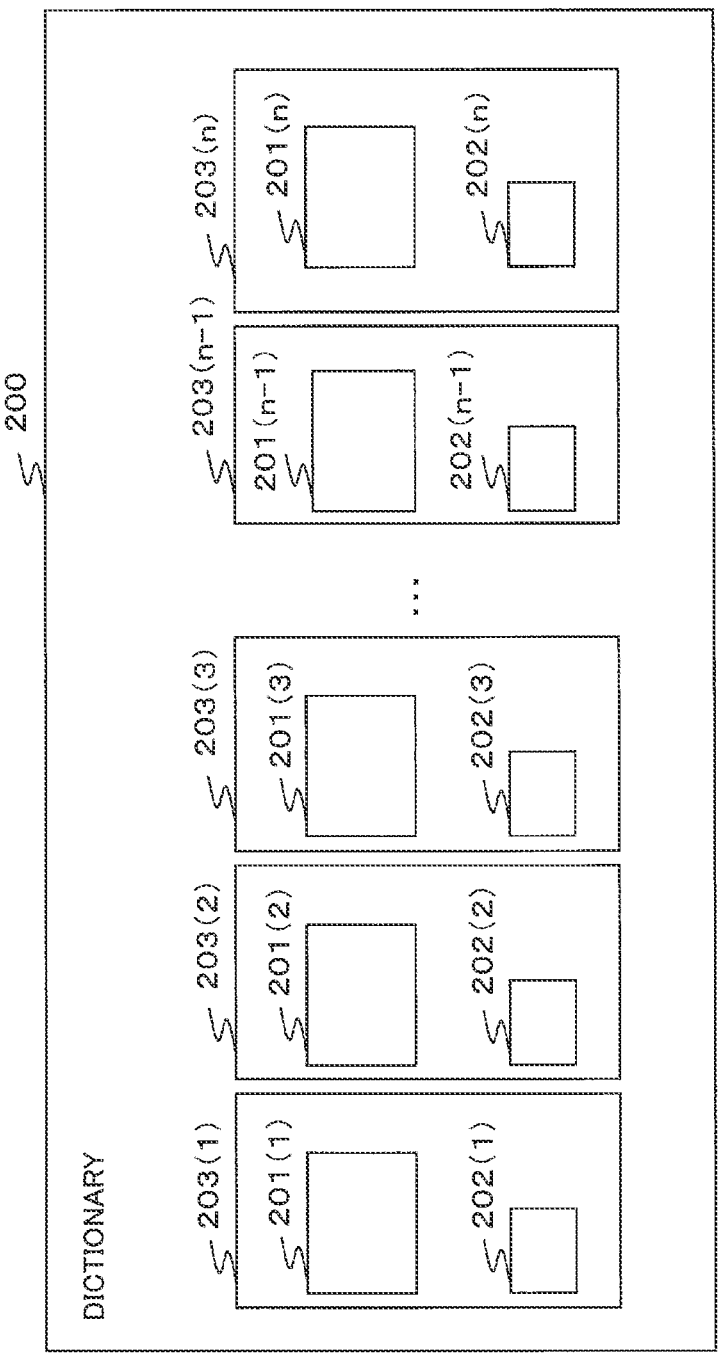
FIG. 4 is a conceptual diagram for explaining a state that a dictionary stores a patch pair in the first exemplary embodiment.

FIG. 4 is a conceptual diagram for explaining a state that the dictionary 200 stores the patch pair. As shown in FIG. 4, the dictionary 200 stores restoration patches 201(1), 201(2), 201 (3) . . . , 201(n−1) and 201(n). Moreover, the dictionary 200 stores deteriorated patches 202(1), 202(2), 202(3) . . . , 202(n−1) and 202(n) which are corresponding to the restoration patches 201 respectively. That is, the dictionary 200 stores patch pairs 203(1), 203(2), 203(3) . . . , 203(n−1) and 203(n) each of which is a pair of the restoration patch 201 and the degradation patch 202. Here, N is an integer.

A method of storing the patch pair in the dictionary 200 is not limited to the storing method, which is shown in FIG. 4, by use of association of each patch. For example, the dictionary 200 may store the learning image as not the patch but one image, and store the learning data in a state that an index, which indicates correspondence of each deteriorated patch to an area of the learning image, is assigned. Moreover, the dictionary 200 may store the patch pair with another method. In this case, structure of the patch may be structure which is adapted to the method of storing the patch pair in the dictionary 200.

Figure 5:
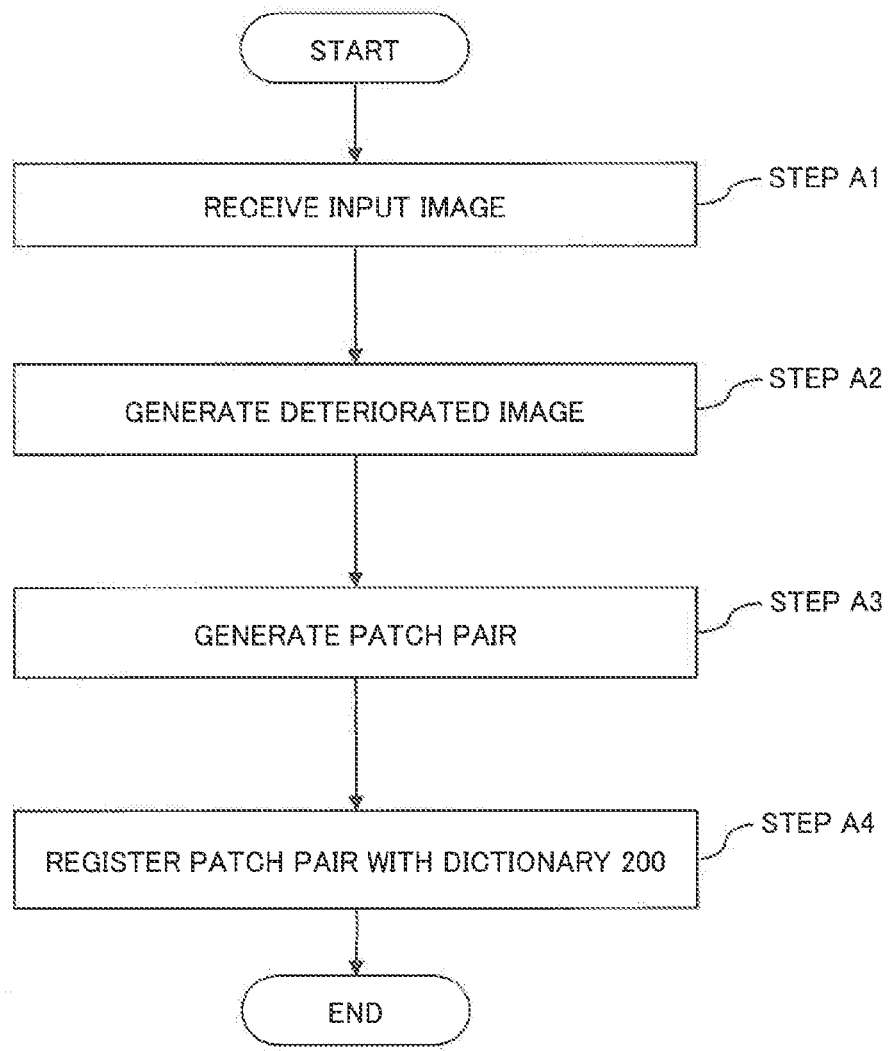
FIG. 5 is a flowchart showing an operation of the learning device in the first exemplary embodiment.

Next, an operation of the learning device 101 will be described with reference to a drawing. FIG. 5 is a flowchart showing the operation of the learning device 101.

The receiving unit 110 receives the learning image from the outside (Step A1).

The deteriorated image generation unit 120 reduces the size of the learning image, which the receiving unit 110 outputs, to, for example, 1 over N of the size to generate the deteriorated image (Step A2).

The patch pair generation unit 130 generates the plural patch pairs, each of which includes the patch of the learning image and the patch of the deteriorated image which are arranged at the positions corresponding each other, and outputs the plural patch pairs to the registration unit 140 (Step A3).

Next, the registration unit 140 outputs the patch pair, which is received from the patch pair generation unit 130, to the dictionary 200 (Step A4). The above is the description on the operation of the learning device 101 which creates the dictionary 200.

(Restoration Phase)

The restoration phase in the first exemplary embodiment will be described in the following with reference to FIGS. 6 to 10.

Figure 6:
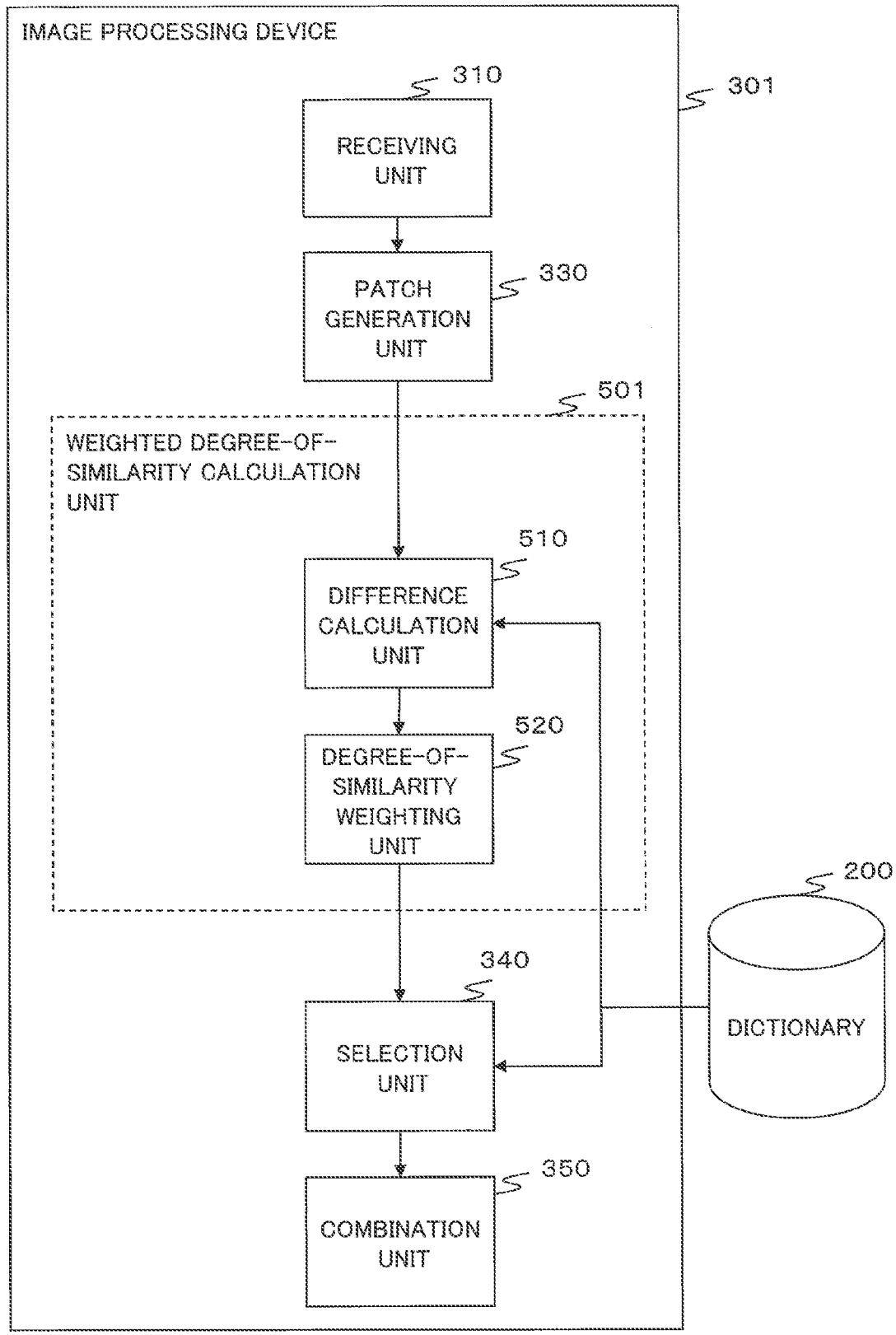
FIG. 6 is a block diagram showing a configuration of an image processing device in the first exemplary embodiment.

FIG. 6 is a block diagram showing a configuration of the image processing device 301. As shown in FIG. 6, the image processing device 301 includes a receiving unit 310, a patch generation unit 330, a selection unit 340, a combination unit 350, and a weighted degree-of-similarity calculation unit 501.

The image processing device 301 receives the input image, which is the target of the image processing, from the outside, and generates the restored image by carrying out the image processing to the input image. Specifically, the image processing device 301 selects the restoration patch on the basis of a degree of similarity between a plurality of the patches (input patches) which are formed by dividing the input image into blocks, and the deteriorated patches which are stored in the dictionary 200. Next, the image processing device 301 generates the restored image by combining the selected plural restoration patches. Detailed description on the degree of similarity between the input patch and the deteriorated patch will be provided later.

The receiving unit 310 receives the input image, which is the target of the image processing, from the outside. For example, the receiving unit 310 may receive the input image through connection with a network, or may receive the input image by reading the input image from a memory which stores the input image. That is, a method of the receiving unit 10 receiving the input image is not limited. The receiving unit 310 outputs the received input image to the patch generation unit 330.

The patch generation unit 330 generates a plurality of the patches (input patches) by dividing the input image, which the receiving unit 310 outputs, into the blocks. The patch generation unit 330 outputs the generated plural input patches to the weighted degree-of-similarity calculation unit 501.

The weighted degree-of-similarity calculation unit 501 uses the dictionary 200, and calculates a weighted degree-of-similarity as the degree of similarity between the plural input patches which are input which are generated by dividing the input image, and the deteriorated patches which are included in the dictionary 200. Here, the weighted degree-of-similarity means the degree of similarity between the weighted deteriorated patch and the weighted input patch. The weighted deteriorated patch is formed by reconfiguring the form of the deteriorated patch using a patch weight which is continuous weight. The weighted input patch is formed by reconfiguring the form of the input patch using the patch weight which is continuous weight. Detailed description on the patch weight and the weighted degree-of-similarity will be provided later.

As shown in FIG. 6, the weighted degree-of-similarity calculation unit 501 includes, for example, a difference calculation unit 510 and a degree-of-similarity weighting unit 520.

The difference calculation unit 510 calculates difference information which indicates differences of each input patch from all deteriorated patches which are included in the dictionary 200. Detailed description on the difference information will be provided later.

The degree-of-similarity weighting unit 520 weights the difference information, which the difference calculation unit 510 calculates, with the patch weight. Continuously, the degree-of-similarity weighting unit 520 calculates the weighted degree-of-similarity on the basis of the weighted difference information. Moreover, the degree-of-similarity weighting unit 520 outputs a set of the weighted degree-of-similarity which is calculated, and a patch identifier 53 of the corresponding deteriorated patch (hereinafter, referred to as weighed degree-of-similarity information).

Figure 7:
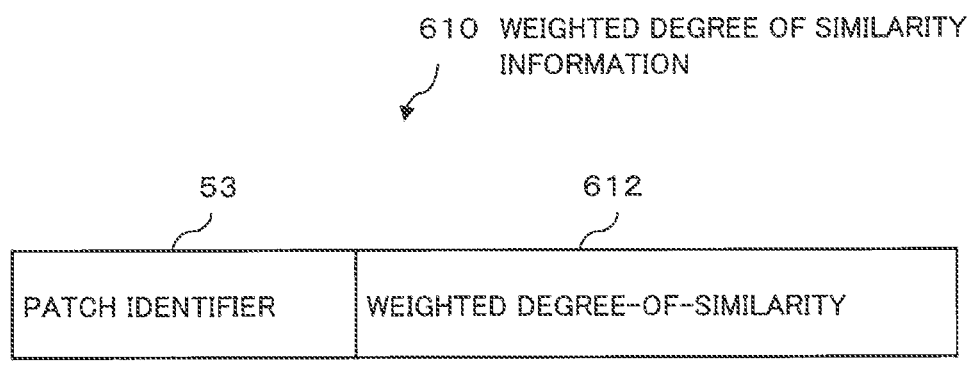
FIG. 7 is a diagram showing an example of weighted degree-of-similarity information in the first exemplary embodiment.

FIG. 7 is a diagram showing an example of the weighted degree-of-similarity information. Weighted degree-of-similarity information 610 includes the patch identifier 53 of the deteriorated patch and weighted degree-of-similarity 612 as shown in FIG. 7.

The selection unit 340 receives the weighted degree-of-similarity information 610 from the weighted degree-of-similarity calculation unit 501. The selection unit 340 selects the restoration patch on the basis of the weighted degree-of-similarity information 610.

Specifically, the selection unit 340 obtains the patch identifier 53 included in the weighted degree-of-similarity information 610 which includes the maximum weighted degree-of-similarity 612 out of the weighted degrees-of-similarity 612 which are corresponding to a certain input patch. Next, the selection unit 340 selects the restoration patch, which is included in the patch pair corresponding to the obtained patch identifier 53, from data on the patch pair which is stored in the dictionary 200. Similarly, the selection unit 340 selects the restoration patch per another input patch. The selection unit 340 outputs the selected plural restoration patches to the combination unit 350.

The combination unit 350 generates the restored image by combining a plurality of the restoration patches which the selection unit 340 outputs.

Here, the weighted degree-of-similarity calculation unit 501 may output only the weighted degree-of-similarity 612. In this case, for example, the deteriorated patch is associated with a sequential identifier. Then, the weighted degree-of-similarity calculation unit 501 transfers the weighted degree-of-similarity to the selection unit 340 so that order information which is indicated by the sequential identifier may be recognized. The selection unit 340 judges the sequential identifier on the basis of the order information, and obtains the restoration patch corresponding to the deteriorated patch.

Figure 8:
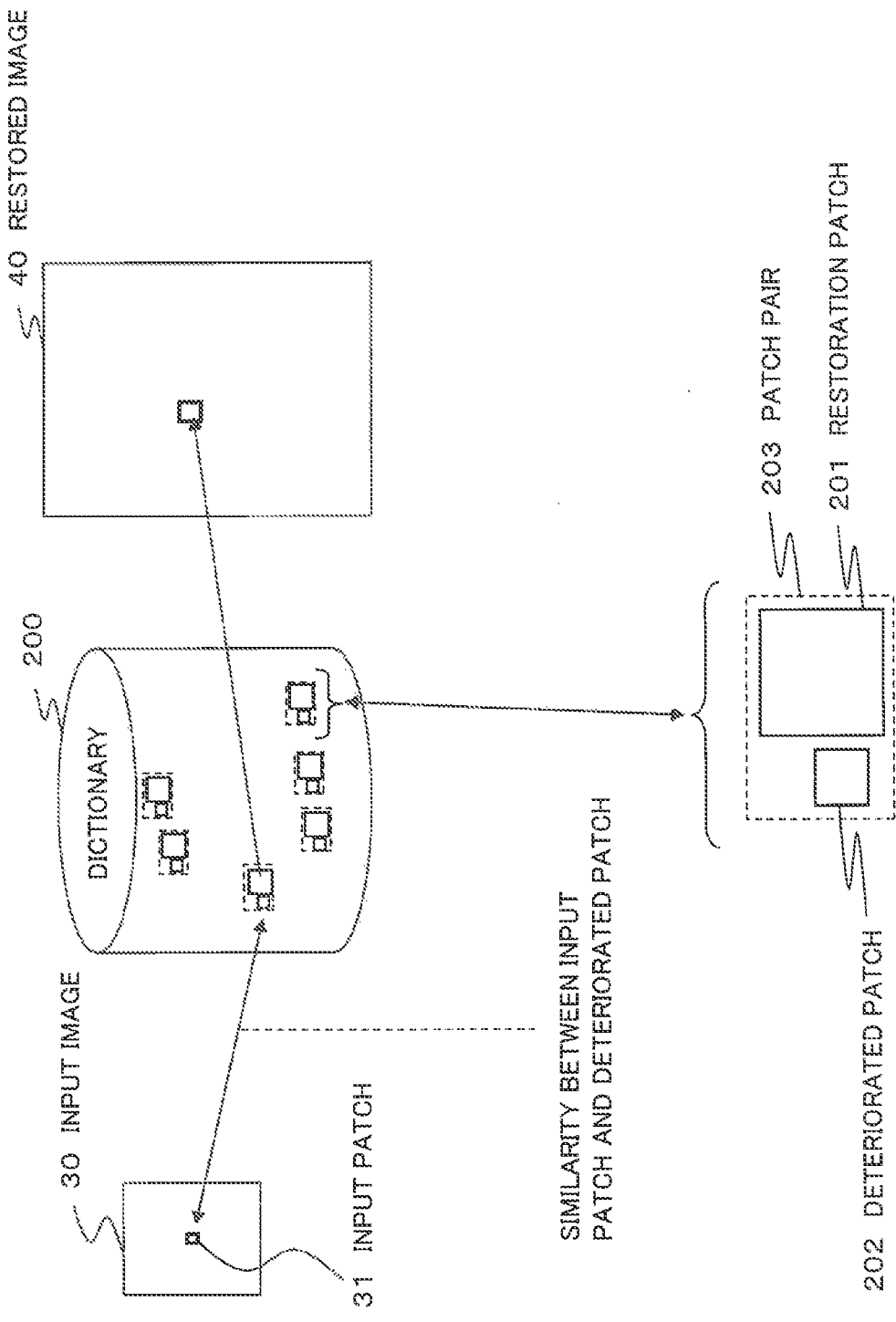
FIG. 8 is a conceptual diagram for explaining a restoration phase in the first exemplary embodiment.

FIG. 8 is a conceptual diagram for explaining the restoration phase. As shown in FIG. 8, the image processing device 301 selects the restoration patch 201 on the basis of similarity (weighted degree-of-similarity) between an input patch 31 of an input image 30 and the deteriorated patch 202 which is stored in the dictionary 200.

Next, the degree of similarity between two patches (for example, input patch and deteriorated patch) will be described.

Figure 9:
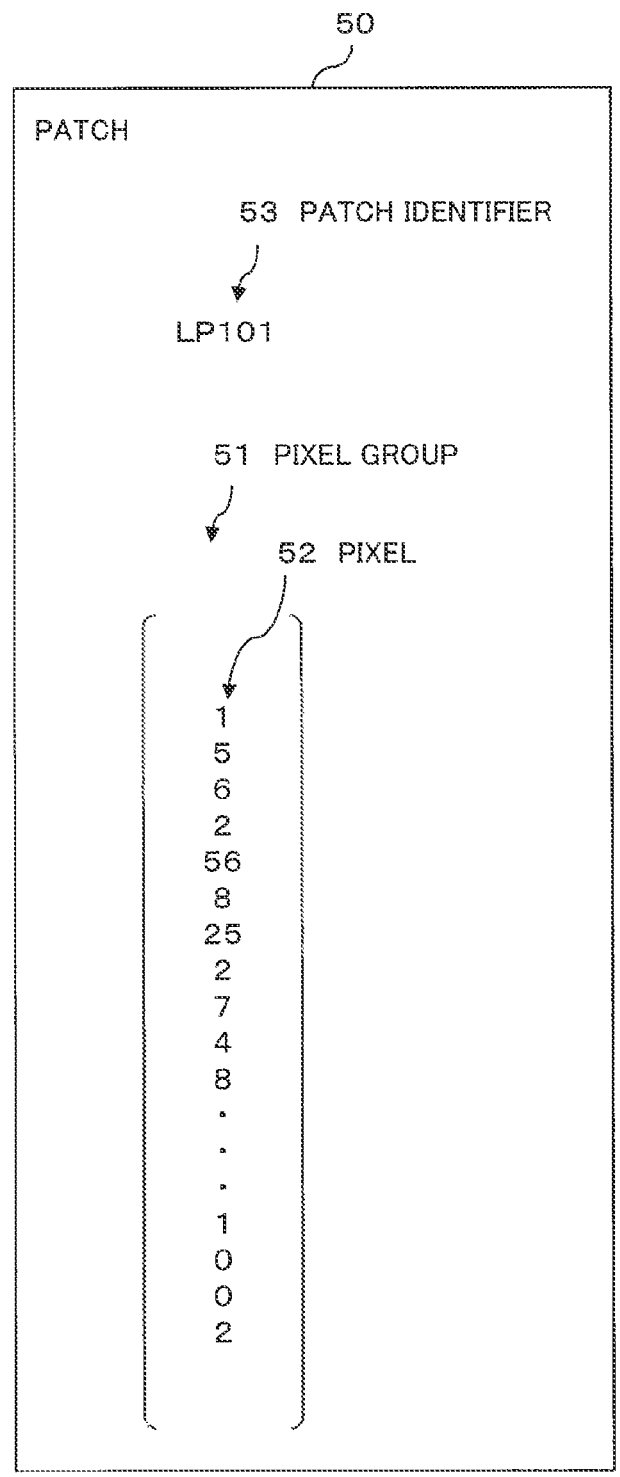
FIG. 9 is a diagram showing an example of a patch in the first exemplary embodiment.

FIG. 9 is a diagram showing an example of a patch 50. As shown in FIG. 9, for example, the patch 50 includes a pixel group 51 forming a multi-dimensional vector whose elements are pixel values of plural pixels 52. Moreover, the patch 50 includes the patch identifier 53, which specifies the patch 50 individually, as meta information. Here, the patch 50 is a comprehensive concept including the restoration patch, the deteriorated patch, and the input patch. The pixel value may be a luminance value but is not limited to the luminance value.

In this case, a value indicating the degree of similarity between two patches may be a value based on a difference between luminance values of the pixels 52. For example, the value indicating the degree of similarity between two patches may be a value based on SSD (Sum of Square Distance) which is a sum of squares of differences between the luminance values of the pixels 52 of the patches. For example, the value indicating the degree of similarity may be a value which is obtained by subtracting SSD from a specific constant. In this case, the specific constant may be SSD which is determined on the basis of the patch which has the minimum luminance, and the patch which has the maximum luminance. Alternatively, the value indicating the degree of similarity between two patches may be a value based on SAD (Sum of Absolute Distance) which is a sum of absolute values of the differences between the luminance values of the pixels 52 of the patches. For example, the value indicating the degree of similarity may be a value which is obtained by subtracting SAD from a specific constant. In this case, the specific constant may be SAD which is determined on the basis of the patch which has the minimum luminance, and the patch which has the maximum luminance.

As another example, the value indicating the degree of similarity between two patches may be, for example, a value which is based on an angle between two characteristic vectors. Alternatively, the value indicating the degree of similarity between two patches may be a value which is calculated by the normalized cross correlation function, but is not limited to the value.

That is, the degree of similarity between two patches is corresponding to the degree of similarity between the images which the pixel groups of two patches indicate respectively.

Next, the patch weight will be described. The patch weight of the patch, which is, for example, in a form of a square having a specific size, is a weight which is corresponding to each pixel of the patch and which is used for processing the patch, having more suitable form and size obtained by reconfiguring the form of the patch with the continuous weight.

Figure 10:
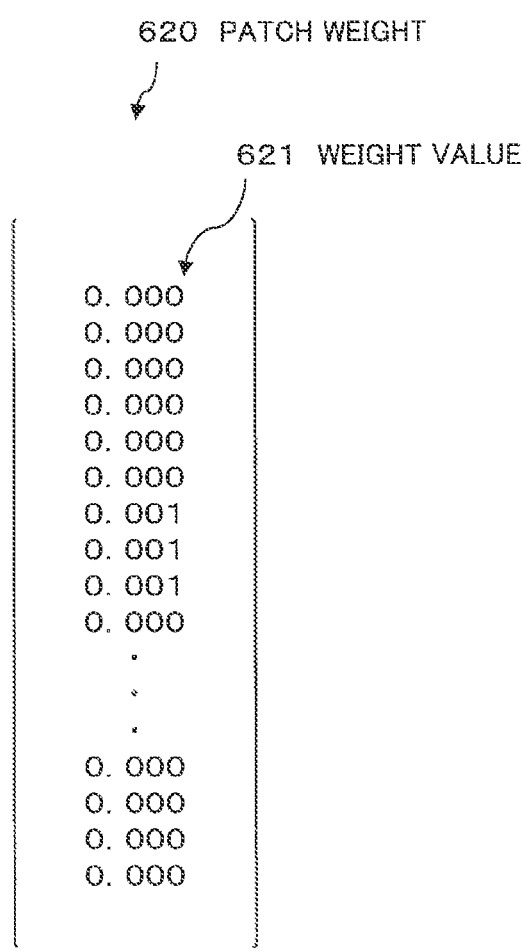
FIG. 10 is a diagram showing an example of a patch weight in the first exemplary embodiment.

FIG. 10 is a diagram showing an example of a patch weight 620. As shown in FIG. 10, the patch weight 620 forms a multi-dimensional vector whose element is a weight value 621. The weight value 621 has one to one correspondence with the pixel 52 of the patch 50 shown in FIG. 9.

Figure 11:
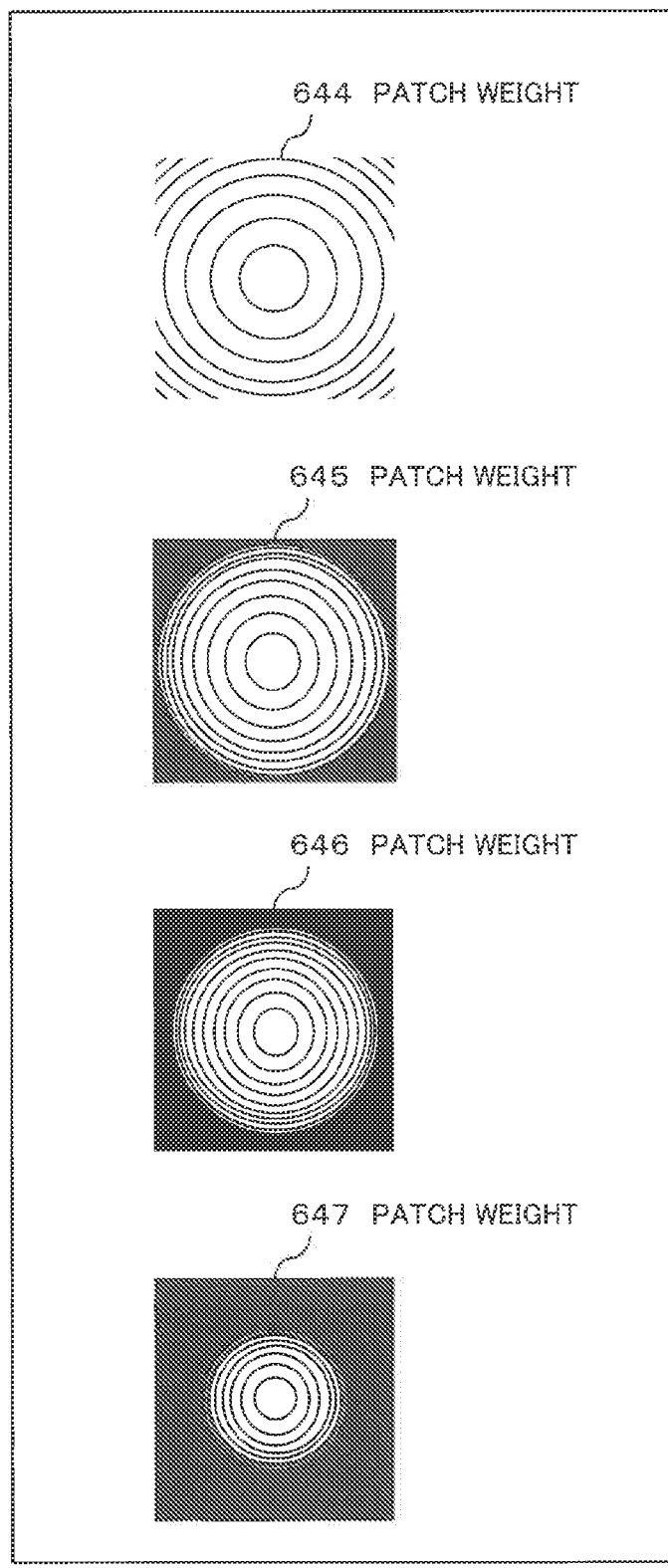
FIG. 11 is a diagram showing an example of the patch weight by use of a picture image in the first exemplary embodiment.

FIG. 11 is a schematic diagram which indicates an example of the patch weight by use of a picture image. FIG. 11 shows that each of a patch weight 644, a patch weight 645, a patch weight 646 and a patch weight 647 is changed continuously. The change is such that a value of the weight becomes large as line density becomes low (as approaching toward a center), and the value of the weight becomes small as the line density becomes high (as approaching toward the outside).

The weight values 621 of the patch weight 644, the patch weight 645, the patch weight 646 and the patch weight 647 shown in FIG. 11 are calculated respectively according to a formula 1.

$$h_g(x, y) = \exp\left(-\frac{x^2 + y^2}{2\sigma^2}\right) \quad \text{(formula 1)}$$

Here, x and y denote x coordinates and y coordinates respectively on an x-y plane whose origin is a center of the patch. $\sigma^2$ denotes the variance.

In the case that the weight value 621 is calculated according to a function indicated in the formula 1, it is possible to control the substantial size (corresponding to an area where the value becomes large) of the patch by a value of $\sigma$. For example, by making $\sigma$ a small, it is possible to generate the patch weight 647 which is steep, that is, becomes large abruptly at a vicinity of center. On the other hand, by making $\sigma$ large, it is possible to generate the patch weight 644 which is relatively flat.

Figure 12:
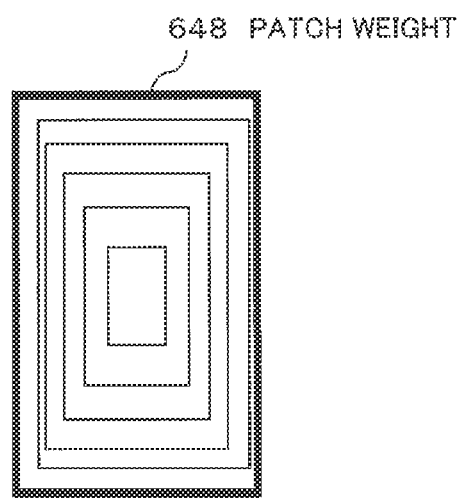
FIG. 12 is a diagram showing an example of the patch weight by use of a picture image in the first exemplary embodiment.

The patch weight may be a patch weight 648 which is shown in FIG. 12. FIG. 12 is a schematic diagram showing another example of the patch weight by use of a picture image.

The patch weight 648 shown in FIG. 12 is calculated according to a formula 2.

$$g(x, y) = \max(0, \min(|1-x|, |1-y|)) \quad \text{(formula 2)}$$

Here, x and y are the x coordinates and the y coordinates on the x-y plane whose origin is the center of the patch.

Here, the patch weight may be defined by a person instead of using the above-mentioned method.

Next, the difference information and the weighted degree-of-similarity 612 will be described.

The difference information is, for example, information including the difference between the luminance values of the pixels of the patches. Here, the difference between the luminance values of the pixels of the patches means a difference between the luminance value of each pixel 52 of one patch, and the luminance value of each pixel 52 of the other patch which is corresponding to each the pixel 52 of the one patch. That is, the difference information is corresponding to a multi-dimensional vector whose number of elements is identical with number of elements of the patch.

For example, in the case that the value indicating the degree of similarity between two patches is SSD, the weighted degree-of-similarity 612 is obtained by subtracting a sum of squares of values, which are obtained by multiplying the difference information by the weight value 621, from a specific constant. Moreover, in the case that the value indicating the degree of similarity between two patches is SAD, the weighted degree-of-similarity 612 is obtained by subtracting a sum of absolute values of values, which are obtained by multiplying the difference information by the weight value 621, from a specific constant. The weight value 621 has one to one correspondence with the difference between the luminance values of the pixels 52 of the patches. That is, in the case of these examples, the weight value 621 has one to one correspondence with the difference information.

Figure 13:
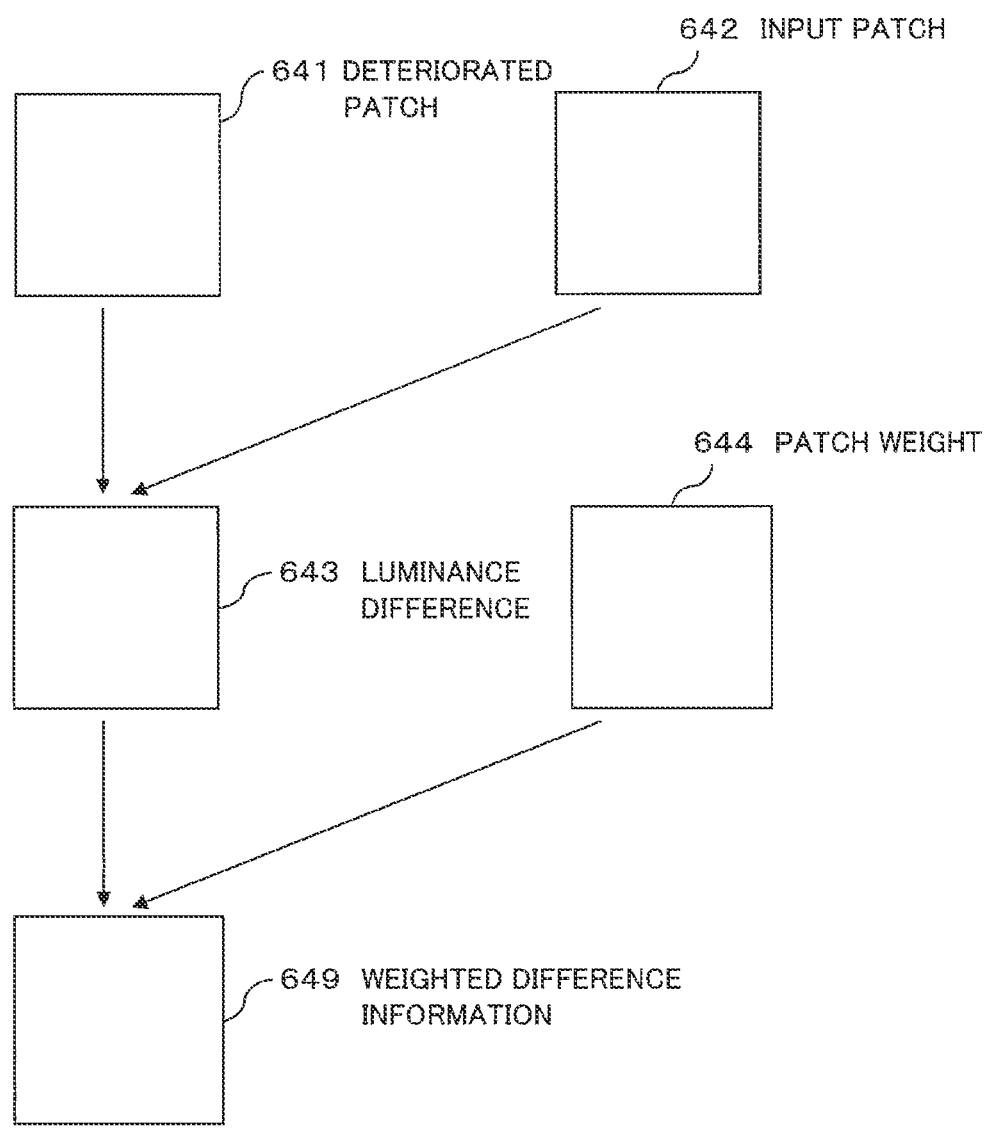
FIG. 13 is a diagram for explaining an operation of calculating weighted difference information in the first exemplary embodiment.

FIG. 13 is a diagram for explaining an operation in which the weighted degree-of-similarity calculation unit 501 calculates weighed difference information 649. As shown in FIG. 13, the difference calculation unit 510 calculates a luminance difference 643 which is the difference between the luminance value of the pixel 52 of a deteriorated patch 641 and the luminance value of the pixel 52 of an input patch 642. Here, the luminance difference 643 is corresponding to the difference information. Next, the degree-of-similarity weighting unit 520 calculates the weighted difference information 649 by multiplying the luminance difference 643 by the patch weight 644.

As described above, the weighted degree-of-similarity calculation unit 501 generates the weighted degree-of-similarity 612 by using the patch weight which reconfigures the form of the patch by use of the continuous weight. The weighted degree-of-similarity 612 can prevent that necessary information is lacked completely and any unnecessary information intermingles.

The reason is as follows. Since the form of the patch is reconfigured by use of the continuous weight, there is no case that the necessary information is lacked completely while an amount of necessary information decreases in the case that the weight becomes small. Similarly, while an amount of unnecessary information increases in the case that the weight becomes large, it is prevented that at least a part of the unnecessary information intermingles.

Moreover, since each patch can be handled as the square which has the fixed size, easy processing is secured.

That is, by reconfiguring the form of the patch by use of the continuous weight, it is possible to secure the easy processing, and to detect the optimum deteriorated patch which is corresponding to the input patch.

Figure 14:
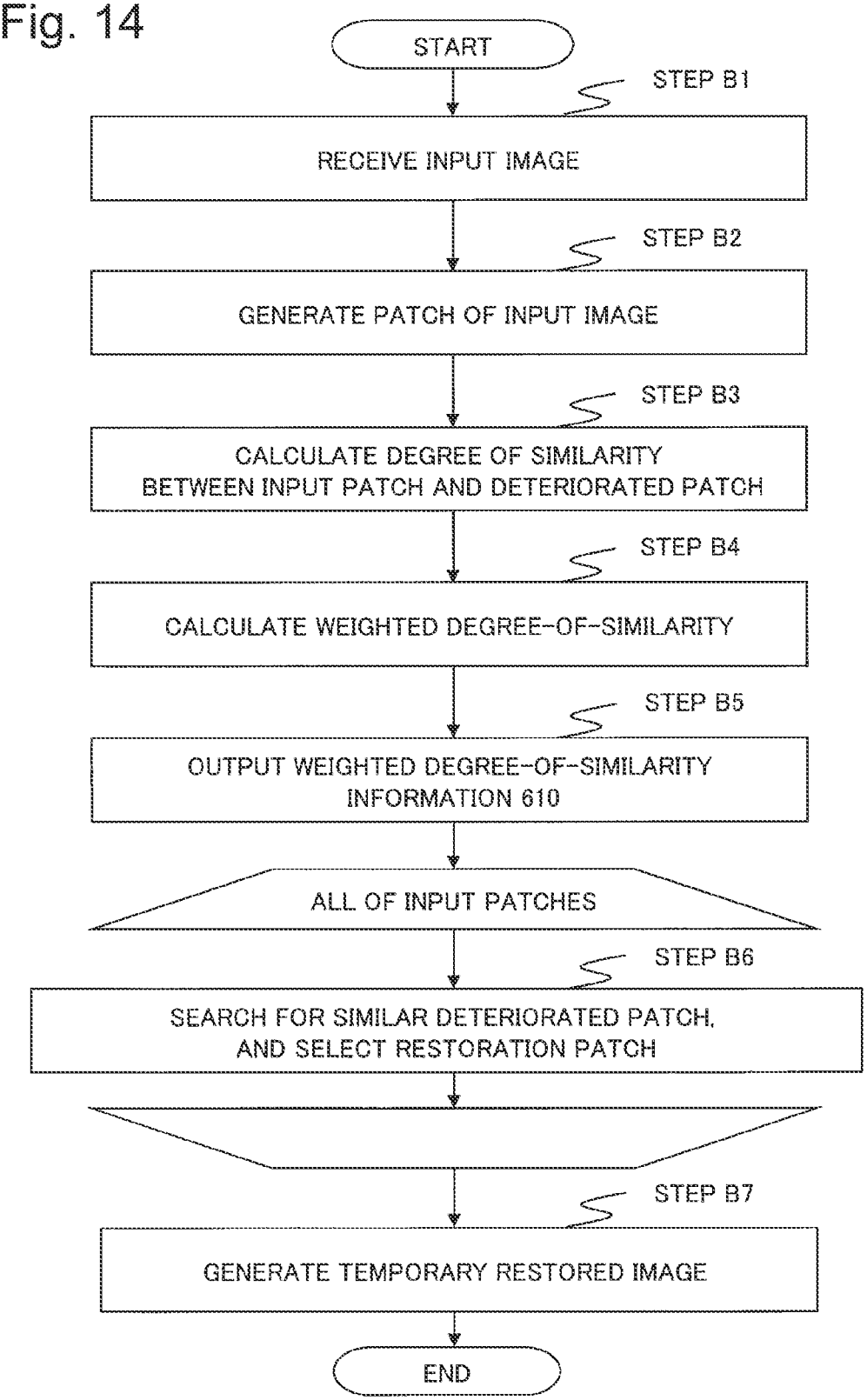
FIG. 14 is a flowchart showing an operation of the image processing device in the first exemplary embodiment.

Next, an operation of the image processing device 301 will be described in detail with reference to a drawing. FIG. 14 is a flowchart showing the operation of the image processing device 301.

The receiving unit 310 receives the input image, which is the target of the image processing, from the outside (Step B1).

The patch generation unit 330 generates a plurality of the patches (input patches) by dividing the input image, which the receiving unit 310 outputs, into the blocks (Step B2). For example, the patch generation unit 330 may define an area, which includes a total of 25 pixels of five in length×five in width, as a patch unit of the input patch. In this case, the patch generation unit 330 may generate the input patch of the input image so that the input patches, which are adjacent each other, may have a relation that one input patch is shifted from the other adjacent input patch by one pixel.

Here, number of the pixels in the area of the patch, and the relation between the adjacent patches are not limited to the above. For example, the patch generation unit 330 may generate the input patch so that the input patches, which are adjacent each other, may have a relation that one input patch is shifted from the other adjacent input patch by three pixels. Here, as the shift number of the pixel between the input patch and the patch adjacent to the input patch is small (overlap of input patch and adjacent patch is large), it is possible to carry out the fine combination process for generating the restored image.

The difference calculation unit 510 calculates the difference information which includes the differences of each input patch, which is generated by the patch generation unit 330, from all deteriorated patches which are stored in the dictionary 200 (Step B3).

The degree-of-similarity weighting unit 520 calculates the weighted degree-of-similarity 612 by weighting the difference information, which the difference calculation unit 510 calculates, with the patch weight (Step B4).

Next, the degree-of-similarity weighting unit 520 outputs the weighted degree-of-similarity information 610 including a set of the weighted degree-of-similarity 612 which is calculated, and the patch identifier 53 of the corresponding deteriorated patch (step B5).

The selection unit 340 obtains the deteriorated patch identifier 53 included in the weighted degree-of-similarity information 610 which includes the maximum weighted degree-of-similarity 612 out of the weighted degrees-of-similarity 612 which are corresponding to a certain input patch. (Step B6).

Next, the selection unit 340 selects the restoration patch, which is included in the patch pair corresponding to the patch identifier 53 of the obtained deteriorated patch, from data on the patch pair which is stored in the dictionary 200, and outputs the selected restoration patch (Step B6).

Similarly, the selection unit 340 carries out Step B6 per the input patch, and selects the restoration patch, and outputs the selected restoration patch.

Here, according to Step B6, the patch identifier 53 of one deteriorated patch, which is corresponding to the weighted degree-of-similarity 612 having the maximum value, is obtained. However, the operation of Step B6 is not limited to the above-mentioned operation. For example, the operation of Step B6 may be as follows. Firstly, the selection unit 340 obtains the patch identifiers 53 of the plural deteriorated patches in an order of largeness of the weighted degree-of-similarity 612 from the maximum value of the weighted degree-of-similarity 612. Secondly, the selection unit 340 obtains the restoration patch which is included in the patch pair corresponding to the patch identifier 53 of each of the obtained plural deteriorated patches. Thirdly, the selection 340 generates the restoration patch newly by combining a plurality of the selected restoration patches. Here, the process of "combining the image (patch)" may be specifically a process of "averaging the pixel values of all images (patches) each of which is a target of the combination". Here, "averaging the pixel values" is to calculate an average value of the pixel values of the pixels which exist at the same positions of the patches.

Next, the combination unit 350 generates the restored image by combining a plurality of the restoration patches which the selection unit 340 outputs (Step B7). Here, the process of "combination" may the process of averaging the pixel values. Specifically, the process of "combination" may the process of averaging the pixel values of all restoration patches which exist in an overlapping area of the restoration patches in the case of arranging all restoration patches at corresponding positions.

The above is the description on the operation of the image processing device 301.

The exemplary embodiment mentioned above has a first effect in a point that it is possible to bring about the sufficient resemblance between the original image and the restored image which is obtained correspondingly to the low resolution input image.

The reason is that the weighted degree-of-similarity calculation unit 501 calculates the weighted degree-of-similarity, and the selection unit 340 selects the restoration patch on the basis of the weighted degree-of-similarity.

The exemplary embodiment mentioned above has a second effect in a point that it is possible to secure the easy process for realizing the first effect.

The reason is that the form of each patch is defined as the form which makes the process easy, and the degree of similarity is weighted with the patch weight whose form is identical with the form of the patch.

<Second Exemplary Embodiment>

Next, a second exemplary embodiment of the present invention will be described in detail with reference to a drawing. Hereinafter, description which overlaps with the above-mentioned description is omitted as far as description on the exemplary embodiment does not become obscure.

Figure 15:
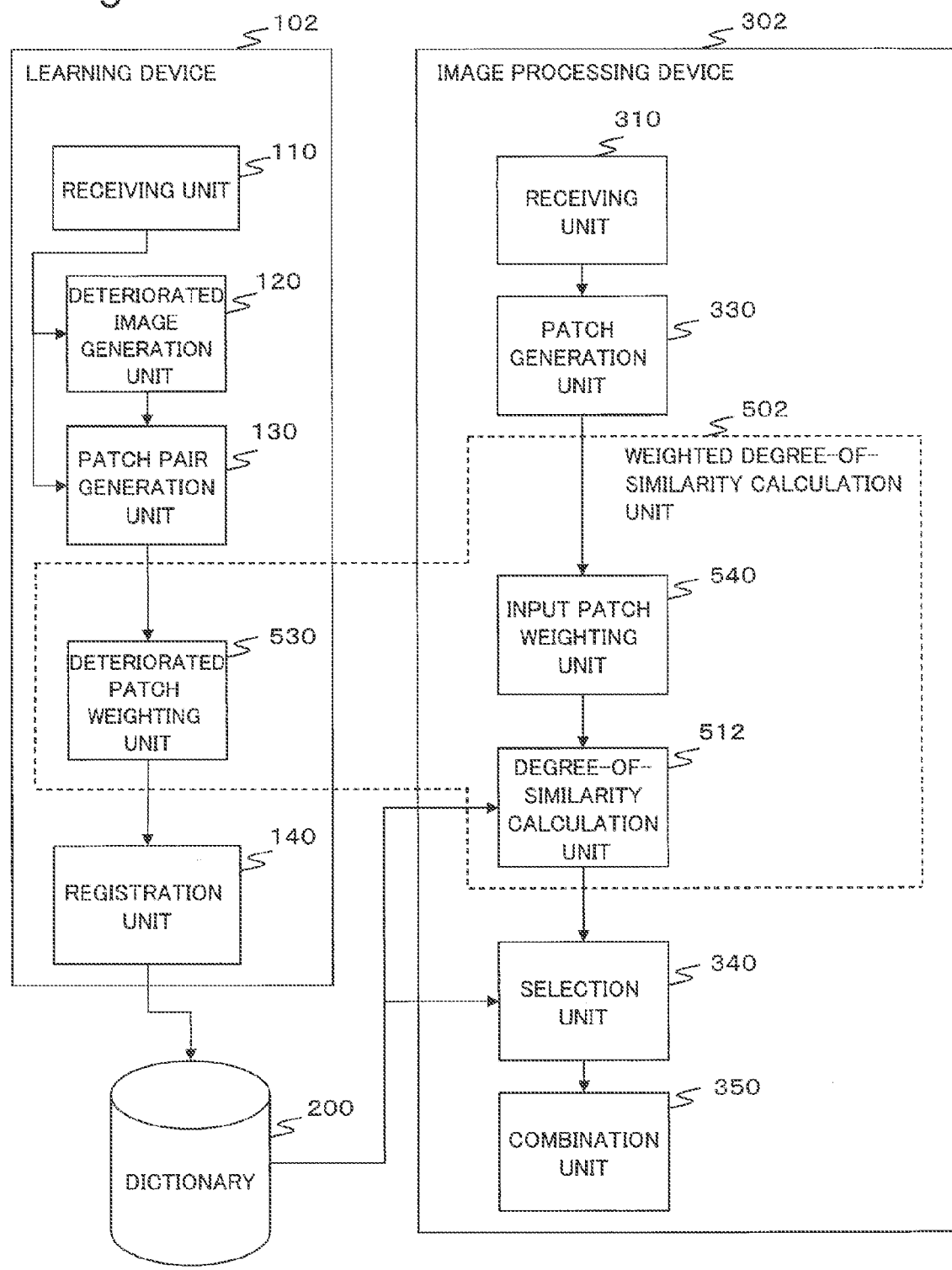
FIG. 15 is a block diagram showing configurations of a learning device and an image processing device according to a second exemplary embodiment.

FIG. 15 is a block diagram showing composition of the second exemplary embodiment of the present invention.

Referring to FIG. 15, a learning device 102 in the exemplary embodiment includes furthermore a deteriorated patch weighting unit 530 in comparison with the learning device 101 of the first exemplary embodiment. In comparison with the image processing device 301 of the first exemplary embodiment, an image processing device 302 in the exemplary embodiment includes an input patch weighting unit 540 and a degree-of-similarity calculation unit 512 in place of the difference calculation unit 510 and the degree-of-similarity weighting unit 520. Here, the deteriorated patch weighting unit 530, the input patch weighting unit 540, and the degree-of-similarity calculation unit 512 compose a weighted degree-of-similarity calculation unit 502.

In the exemplary embodiment, the patch pair generation unit 130 outputs the patch pair to the deteriorated patch weighting unit 530 in place of the registration unit 140.

The deteriorated patch weighting unit 530 receives the patch pair which the patch pair generation unit 130 outputs. The deteriorated patch weighting unit 530 generates the weighted deteriorated patch by weighting the deteriorated patch, which is included in the received patch pair, with the patch weight. The deteriorated patch weighting unit 530 outputs the patch pair, which replaces the deteriorated patch with the weighted deteriorated patch, to the registration unit 140.

In the exemplary embodiment, the registration unit 140 receives the patch pair from the deteriorated patch weighting unit 530 in place of the patch pair generation unit 130.

In the exemplary embodiment, the patch generation unit 330 outputs the input patch to the input patch weighting unit 540 of the weighted degree-of-similarity calculation unit 502 in place of the weighted degree-of-similarity calculation unit 501.

The input patch weighting unit 540 generates the weighted input patch by weighting the received input patch with the patch weight. The input patch weighting unit 540 outputs the weighted input patch to the degree-of-similarity calculation unit 512.

The degree-of-similarity calculation unit 512 calculates the degree of similarity of each weighted input patch to all weighted deteriorated patches which are stored in the dictionary 200. The degree of similarity obtained at this point is the same as the degree of similarity which the weighted degree-of-similarity calculation unit 501 of the first exemplary embodiment calculates. Moreover, the degree-of-similarity calculation unit 512 outputs the weighted degree-of-similarity information, which is a set of the calculated degree-of-similarity (weighted degree-of-similarity), and the patch identifier 53 of the corresponding weighted deteriorated patch, to the selection unit 340.

In the exemplary embodiment, the selection unit 340 receives the weighted degree-of-similarity information from the weighted degree-of-similarity calculation unit 502 in place of the weighted degree-of-similarity calculation unit 501.

Figure 16:
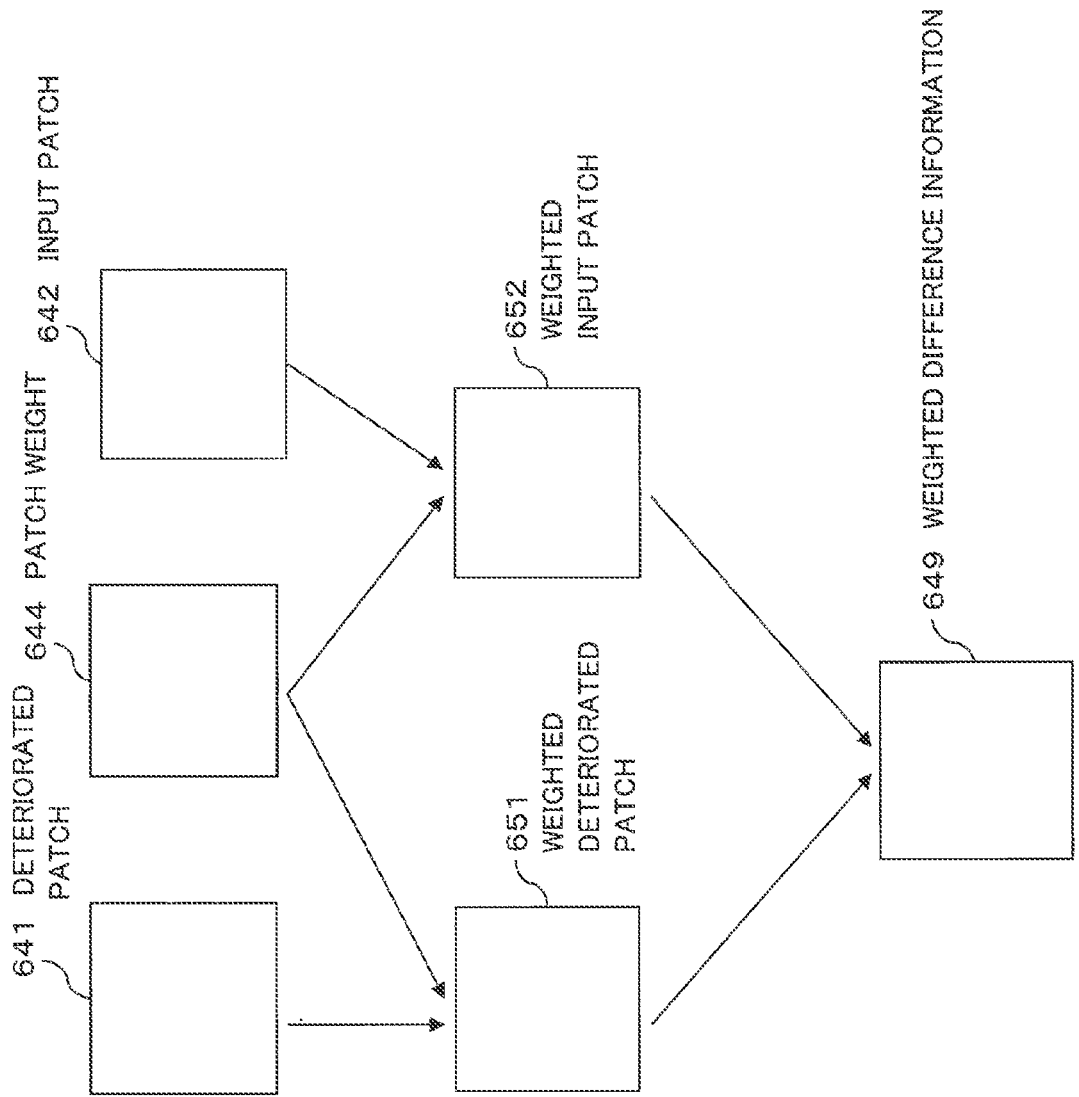
FIG. 16 is a diagram for explaining an operation of calculating weighted difference information in the second exemplary embodiment.

FIG. 16 is an image diagram showing that the weighted difference information 649, which is the same as the weighted difference information 649 of the first exemplary embodiment shown in FIG. 13, is calculated in the exemplary embodiment. Firstly, the deteriorated patch weighting unit 530 calculates a weighted deteriorated patch 651 by multiplying the deteriorated patch 641 by the patch weight 644. Secondly, the input patch weighting unit 540 calculates a weighted input patch 652 by multiplying the input patch 642 by the patch weight 644. Thirdly, the degree-of-similarity calculation unit 512 calculates the weighted difference information 649 which includes the difference between the luminance value of each pixel 52 of the weighted deteriorated patch 651 and the luminance value of each pixel 52 of the weighted input patch 652.

Similarly to the first exemplary embodiment, the exemplary embodiment mentioned above has a first effect in a point that it is possible to bring about the sufficient resemblance between the original image and the restored image which is obtained correspondingly to the low resolution input image.

The reason is that the weighted degree-of-similarity calculation unit 502 calculates the weighted degree-of-similarity, and the selection unit 340 selects the restoration patch on the basis of the weighted degree-of-similarity.

Similarly to the first exemplary embodiment, the exemplary embodiment mentioned above has a second effect in a point that it is possible to secure the easy process for realizing the first effect.

The reason is that the form of each patch is defined as the form which makes the process easy, and each patch is weighted with the patch weight whose form is identical with the form of the patch, and the difference information between the weighted patches is calculated.

<Third Exemplary Embodiment>

Next, a third exemplary embodiment of the present invention will be described in detail with reference to a drawing. Hereinafter, description which overlaps with the above-mentioned description is omitted as far as description on the exemplary embodiment does not become obscure.

Figure 17:
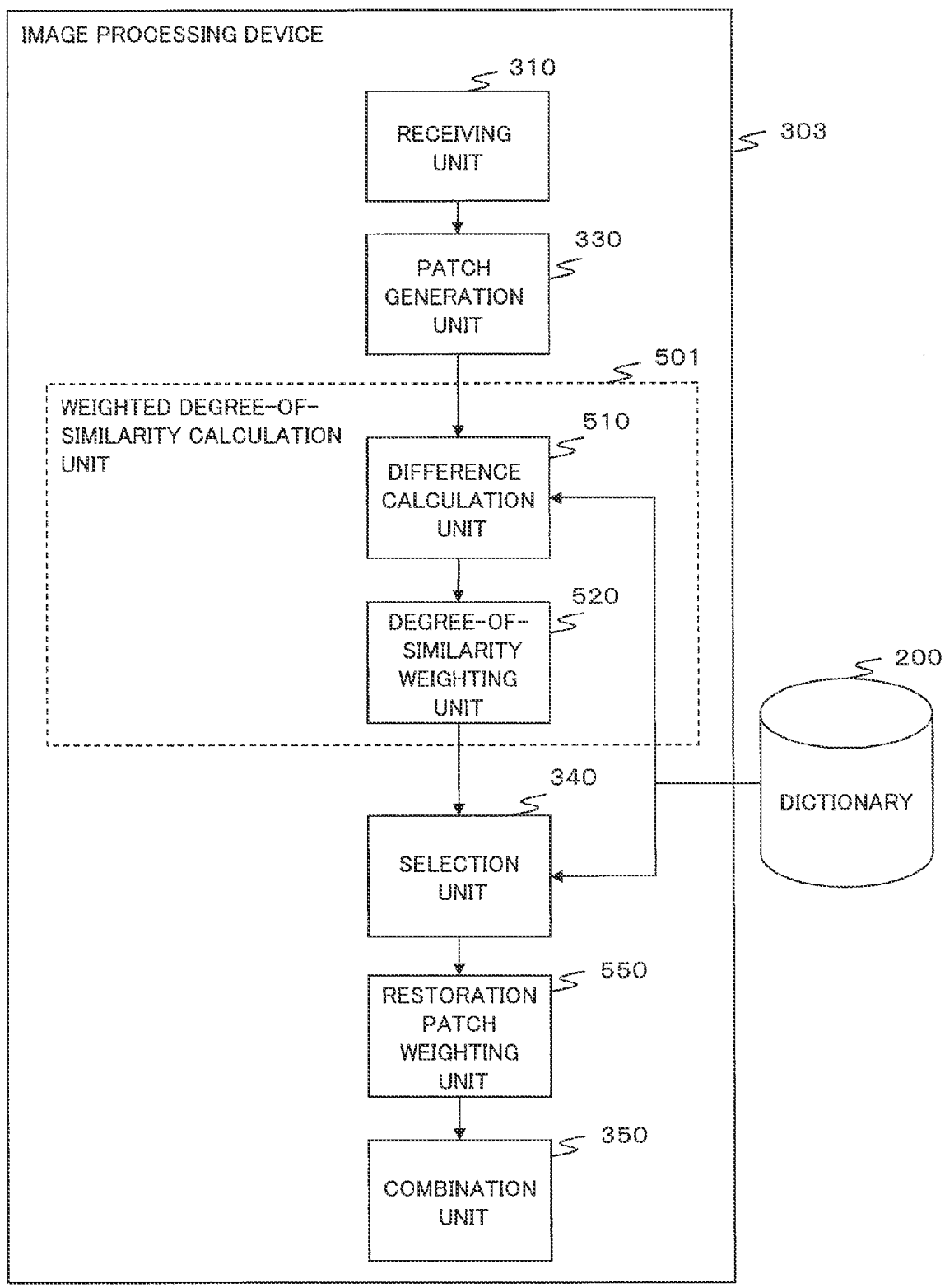
FIG. 17 is a block diagram showing a configuration of an image processing device according to a third exemplary embodiment.

FIG. 17 is a block diagram showing a configuration of an image processing device 303 according to the third exemplary embodiment of the present invention.

Referring to FIG. 17, the image processing device 303 in the exemplary embodiment includes furthermore a restoration patch weighting unit 550 in comparison with the image processing device 301 of the first exemplary embodiment.

The selection unit 340 of the exemplary embodiment outputs the restoration patch to the restoration patch weighting unit 550 in place of the combination unit 350.

The restoration patch weighting unit 550 generates the weighted restoration patch by weighting the restoration patch with the patch weight. The restoration patch weighting unit 550 outputs the weighted restoration patch, which is generated, to the combination unit 350.

In the exemplary embodiment, the combination unit 350 generates the restored image by combining the weighted restoration patches, which are received from the restoration patch weighting unit 550, in place of the restoration patches which are received from the selection unit 340.

Here, the exemplary embodiment may be applied to the second exemplary embodiment.

In addition to the effect of the first exemplary embodiment, the exemplary embodiment mentioned above has an effect in a point that it is possible to obtain the restored image which has the sufficient resemblance to the original image even in the case that a portion having small weight in the restoration patch, which is selected on the basis of the weighted degree-of-similarity, is quite different from the original image.

The reason is that the restoration patch weighting unit 550 weights the restoration patch with the patch weight.

<Fourth Exemplary Embodiment>

Next, a fourth exemplary embodiment of the present invention will be described in detail with reference to a drawing. Hereinafter, description which overlaps with the above-mentioned description is omitted as far as description on the exemplary embodiment does not become obscure.

Figure 18:
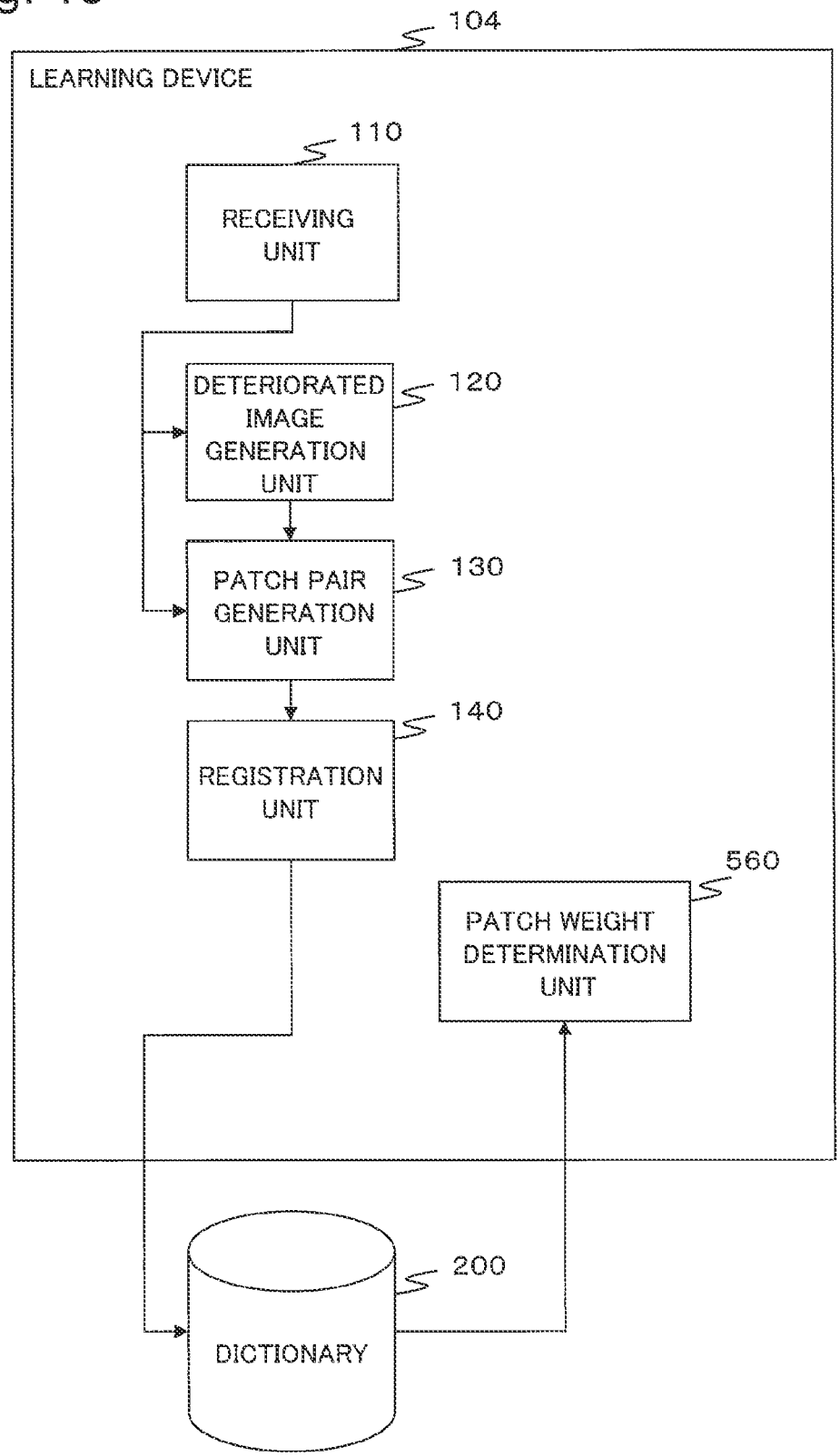
FIG. 18 is a block diagram showing a configuration of a learning device according to a fourth exemplary embodiment.

FIG. 18 is a block diagram showing a configuration of a learning device 104 according to the fourth exemplary embodiment of the present invention.

Referring to FIG. 18, the learning device 104 in the exemplary embodiment includes furthermore a patch weight determination unit (also called a degree-of-risk patch weight determination means) 560 in comparison with the learning device 101 of the first exemplary embodiment.

The patch weight determination unit 560 determines each of the plural patch weights on the basis of a degree of risk which is calculated per the deteriorated patch.

The degree of risk is a ratio of the degree of similarity between the deteriorated patches to the degree of similarity between the restoration patches which are corresponding to the deteriorated patches respectively. A value of the degree of risk becomes large as a value of the degree of similarity between the restoration patches, which are corresponding to the deteriorated patches respectively, is small in comparison with a value of the degree of similarity between the deteriorated patches. That is, the value of the degree of risk becomes large in the case that the deteriorated patches are similar each other, but the restoration patches corresponding to the deteriorated patches respectively are not similar each other.

For example, the patch weight determination unit 560 calculates a degree of risk K by use of the following formula 3, formula 4 and formula 5.

The formula 3 is a formula which calculates an average value $D_{LR}$ of distances between the selected deteriorated patch and the deteriorated patches which exist in a K neighborhood. The deteriorated patches existing in the K neighborhood means the deteriorated patches which are selected in an order of short distance from the selected deteriorated patch and whose number is K (for example, 7). A denominator of the right side of the formula 3 is a product of the number (that is, K) of the deteriorated patches existing in the K neighborhood of the selected deteriorated patch, and number of the pixels $S_L$ of the deteriorated patch. Moreover, a numerator of the right side of the formula 3 is a total sum of L2 norms of the selected deteriorated patch, and the deteriorated patches existing in the K neighborhood.

$$D_{LR} = \frac{\sum_{i \in R} \|x_i - x_k\|_2^2}{K \cdot S_L} \quad \text{(formula 3)}$$

The formula 4 is a formula which calculates an average value $D_{HR}$ of distances between the selected restoration patch and the deteriorated patches existing in the K neighborhood. The restoration patches existing in the K neighborhood means the restoration patches which are selected in an order of short distance from the selected restoration patch and whose number is K (for example, 7). A denominator of the right side of the formula 4 is a product of the number (that is, K) of the restoration patches existing in the K neighborhood of the selected deteriorated patch, and number of the pixels $S_H$ of the restoration patch. Moreover, a numerator of the right side of the formula 4 is a total sum of L2 norms of the selected restoration patch, and the restoration patches existing in the K neighborhood.

$$D_{HR} = \frac{\sum_{i \in R} \|x_i - x_k\|_2^2}{K \cdot S_H} \quad \text{(formula 4)}$$

The formula 5 is a formula which calculates the degree of risk K.

α is a constant for adjusting a value range of K in the case that $D_{LR}$ is small.

$$K = \frac{D_{HR}}{D_{LR} + \alpha} \quad \text{(formula 5)}$$

Next, the patch weight determination unit 560 selects the patch weight, which is corresponding to the minimum degree of risk K, per the deteriorated patch.

Next, the patch weight determination unit 560 calculates an average patch weight which is obtained by averaging all of the selected patch weights.

Next, the patch weight determination unit 560 outputs the calculated average patch weight.

The degree-of-similarity weighting unit 520 of the image processing device 301 of the exemplary embodiment weights the degree of similarity with the average patch weight which the patch weight determination unit 560 calculates.

Moreover, in the case that the patch weight determination unit 560 is applied to the second exemplary embodiment, a configuration may be, for example, as follows. Firstly, the receiving unit 110, the deteriorated image generation unit 120, and the patch pair generation unit create a temporary dictionary (not shown in the figure). Secondly, the patch weight determination unit 560 calculates the average patch weight with reference to the temporary dictionary. Thirdly, the deteriorated patch weighting unit 530 weights the deteriorated patch with the average patch weight. Similarly, the input patch weighting unit 540 weights the input patch with the average patch weight.

Moreover, in the case that the patch weight determination unit 560 is applied to the third exemplary embodiment, also the restoration patch weighting unit 550 in addition to the degree-of-similarity weighting unit 520 weights the restoration patch with the average patch weight.

In addition to the effect of the first exemplary embodiment, the exemplary embodiment has an effect that it is possible to determine the suitable patch weight automatically.

The reason is that the patch weight determination unit 560 calculates the average patch weight on the basis of the degree of risk K, which is calculated per the deteriorated patch, for each of the plural patch weights.

<Fifth Exemplary Embodiment>

Next, a fifth exemplary embodiment of the present invention will be described in detail with reference to a drawing.

Hereinafter, description which overlaps with the above-mentioned description is omitted as far as description on the exemplary embodiment does not become obscure.

Figure 19:
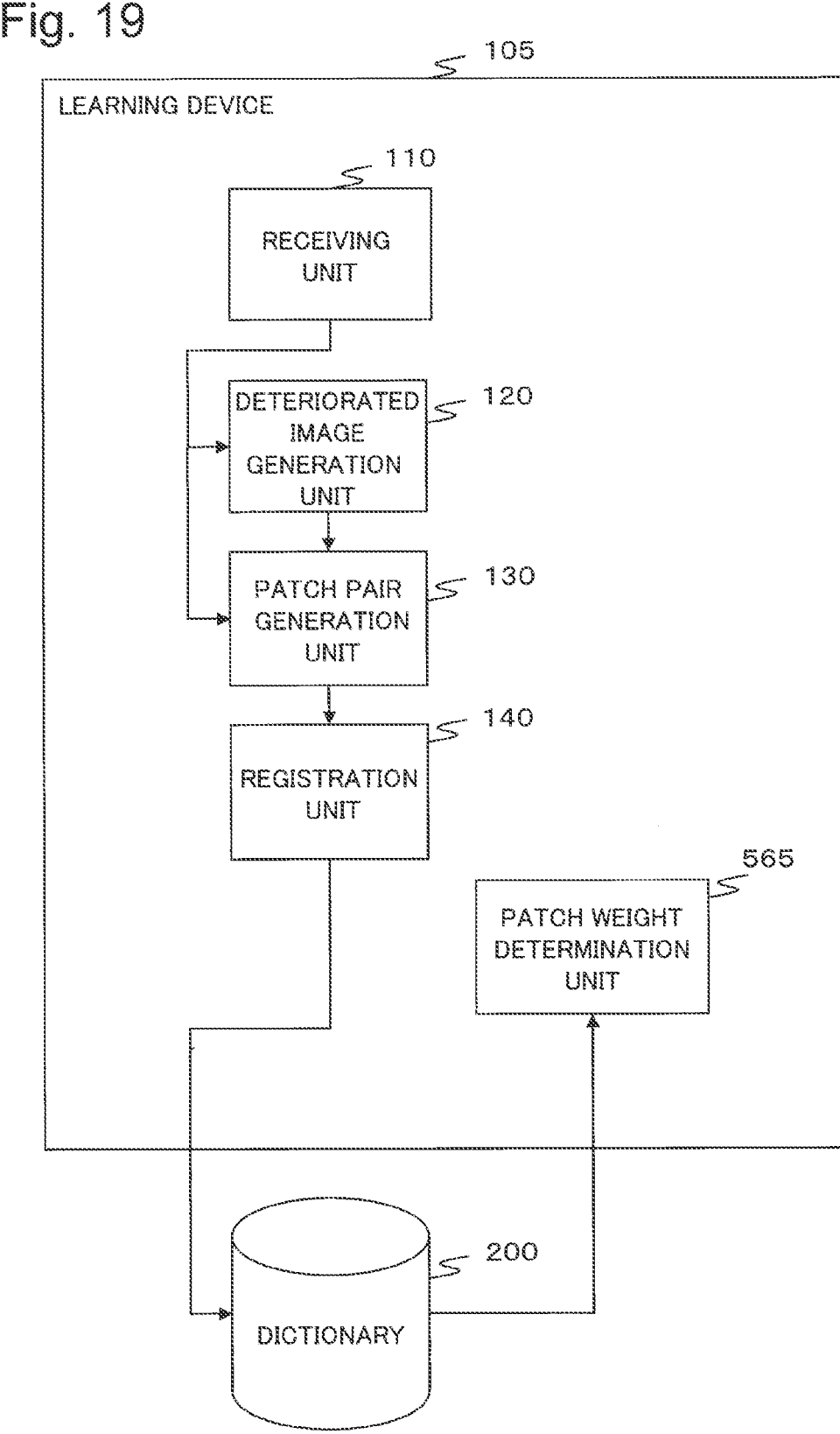
FIG. 19 is a block diagram showing a configuration of a learning device according to a fifth exemplary embodiment.

FIG. 19 is a block diagram showing a configuration of a learning device 105 according to the fifth exemplary embodiment.

Referring to FIG. 19, the learning device 105 in the exemplary embodiment includes a patch weight determination unit (also called a learning patch weight determination means) 565 in place of the patch weight determination unit 560 in comparison with the learning device 104 of the fourth exemplary embodiment.

Figure 20:
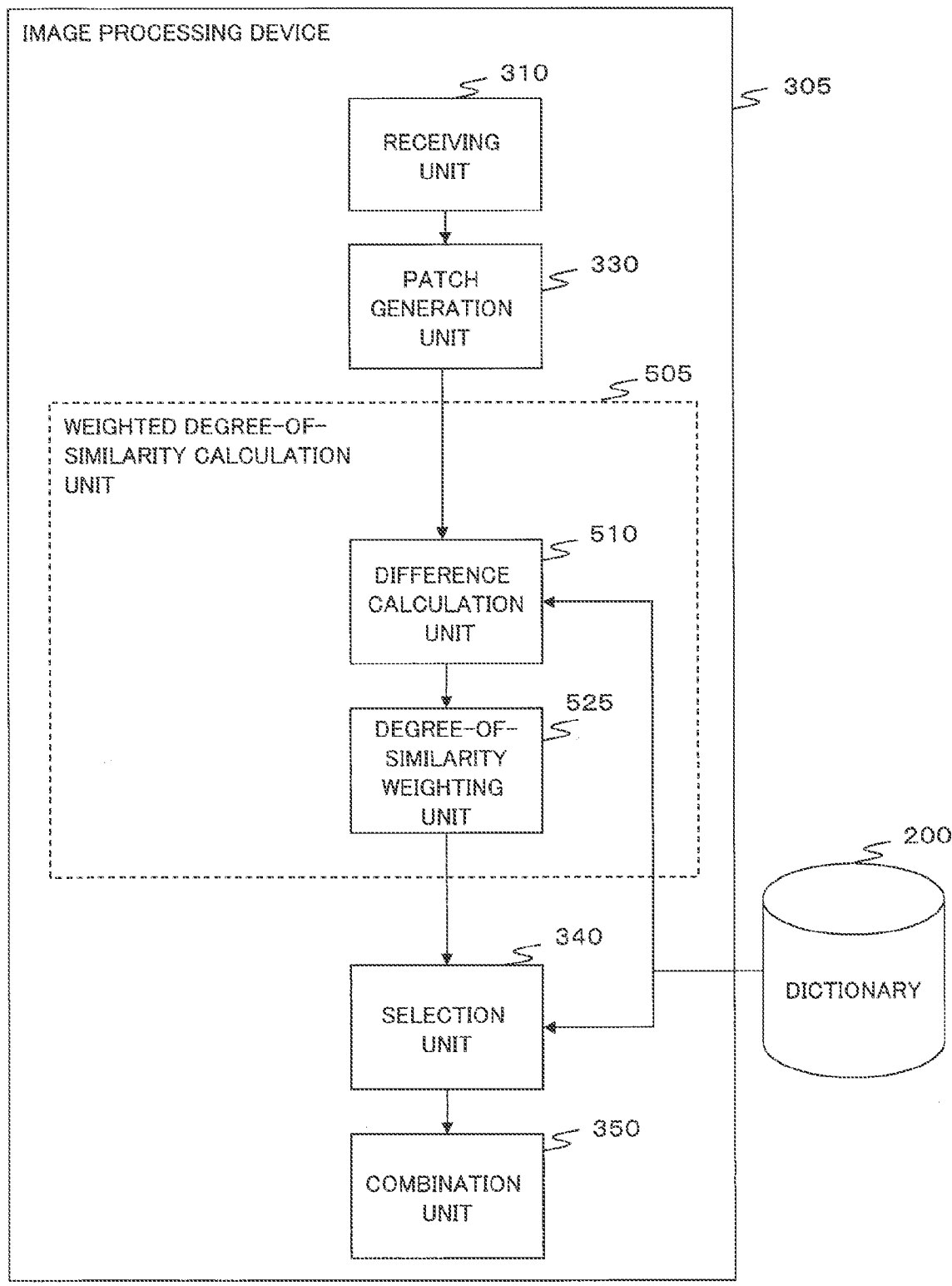
FIG. 20 is a block diagram showing a configuration of an image processing device according to the fifth exemplary embodiment.

FIG. 20 is a block diagram showing a configuration of an image processing device 305 according to the fifth exemplary embodiment.

Referring to FIG. 20, the image processing device 305 in the exemplary embodiment includes a weighted degree-of-similarity calculation unit 505 in place of the weighted degree-of-similarity calculation unit 501 in comparison with the image processing device 301 of the fourth exemplary embodiment (first exemplary embodiment). The weighted degree-of-similarity calculation unit 505 includes a degree-of-similarity weighting unit 525 in place of the degree-of-similarity weighting unit 520 in comparison with the weighted degree-of-similarity calculation unit 501.

Figure 21:
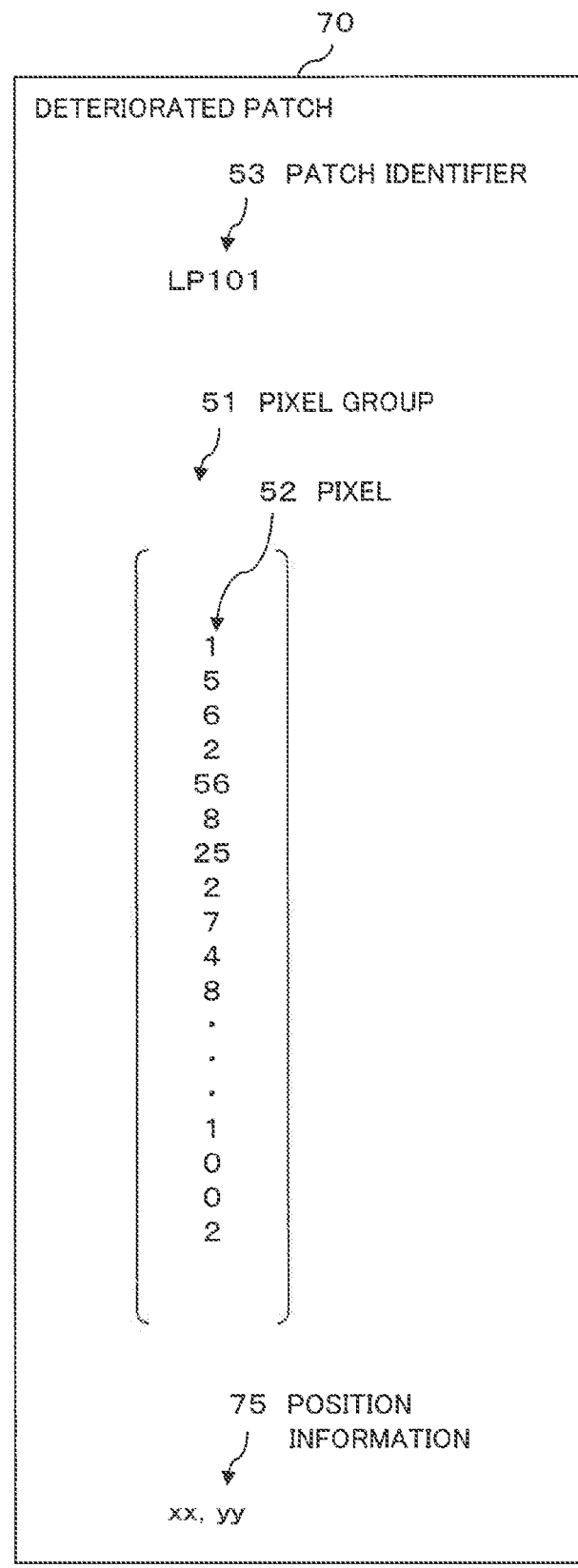
FIG. 21 is a diagram showing an example of a patch in the fifth exemplary embodiment.

FIG. 21 is a diagram showing an example of a deteriorated patch 70 in the exemplary embodiment. As shown in FIG. 21, the deteriorated patch 70 includes furthermore position information 75 as meta information in comparison with the patch 50 shown in FIG. 9. The position information 75 indicates, for example, central coordinates of the deteriorated patch 70 (deteriorated patch 202) in the case that it is assumed that the deteriorated image 20 forms an x-y plane. A mark "xx" of the position information 75 shown in FIG. 21 shows coordinates of the x axis, and a mark "yy" shows coordinates of the y axis.

The patch weight determination unit 565 determines the patch weight per a predetermined position range of the deteriorated image 20. For example, in the case that the deteriorated image 20 forms the x-y plane of 0≤x<100 and 0≤y<100, the position range is indicated by starting x-y coordinates (for example, (10, 20)) and end x-y coordinates (for example, (20, 50)). There may be a plurality of the position ranges. The position range may have any form and any position other than the left-side description. Moreover, the position range may be a cluster of portions which are not designated explicitly as the position range. The patch weight determination unit 565 determines the patch weight of the specific position range by use of the deteriorated patch 70 whose position range includes the position information 75.

The patch weight determination unit 565, for example, carries out a patch weight determination process by carrying out the following learning per the specific position range to determine the patch weight.

Firstly, the patch weight determination unit 565 generates a low resolution input image from a high resolution image (referred to as a true value image) which is different from the learning image. For example, the patch weight determination unit 565 generates the input image with a method similar to the method with which the deteriorated image generation unit 120 generates the deteriorated image.

Next, as described in the first exemplary embodiment, the patch weight determination unit 565 generates a plurality of restored images 40 by applying the plural candidates for the patch weight to the specific position range of the generated input image.

Next, the patch weight determination unit 565 calculates a difference between each of the generated plural restored images 40 and the true value image, and determines the candidate for the patch weight, which is used for generating the weighted degree-of-similarity which generates the restored image 40 having the smallest difference, as the patch weight.

Similarly, the patch weight determination unit 565 determines the patch weight per the position range.

Here, the patch weight determination unit 565 may determine the patch weight per the position range with the method which is described in the fourth exemplary embodiment.

In the exemplary embodiment, the difference calculation unit 510 of the weighted degree-of-similarity calculation unit 505 adds the position information 75, which is the meta information of the deteriorated patch 70, to the calculated difference information. The degree-of-similarity weighting unit 525 selects the patch weight on the basis of the position information 75 which is included in the difference information, and weights the difference information with the selected patch weight.

Here, a case that the patch weight determination unit 565 is applied to the second exemplary embodiment is similar to the case that the patch weight determination unit 560 is applied to the second exemplary embodiment. Moreover, the deteriorated patch 202 and the input patch 31 include the position information. Then, the deteriorated patch weighting unit 530 and the input patch weighting unit 540 select the patch weights on the basis of the position information which is included in the deteriorated patch and the input patch, and weight the deteriorated patch and the input patch with the selected patch weights respectively.

Moreover, in the case that the patch weight determination unit 565 is applied to the third exemplary embodiment, also the restoration patch weighting unit 550 in addition to the degree-of-similarity weighting unit 520 selects the patch weight on the basis of the position information of the deteriorated patch which is corresponding to the restoration patch. Then, the restoration patch weighting unit 550 weights the restoration patch with the selected patch weight.

In addition to the effect of the first exemplary embodiment, the exemplary embodiment mentioned above has an effect that it is possible to obtain the optimum restored image per the position range on the input image.

The reason is that the patch weight determination unit 565 determines the patch weight per the position range, and the degree-of-similarity weighting unit 525 selects the patch weight on the basis of the position information, and weights the degree of similarity with the selected patch weight.

<Sixth Exemplary Embodiment>

Next, a sixth exemplary embodiment of the present invention will be described in detail with reference to a drawing. Hereinafter, description which overlaps with the above-mentioned description is omitted as far as description on the exemplary embodiment does not become obscure.

Figure 22:
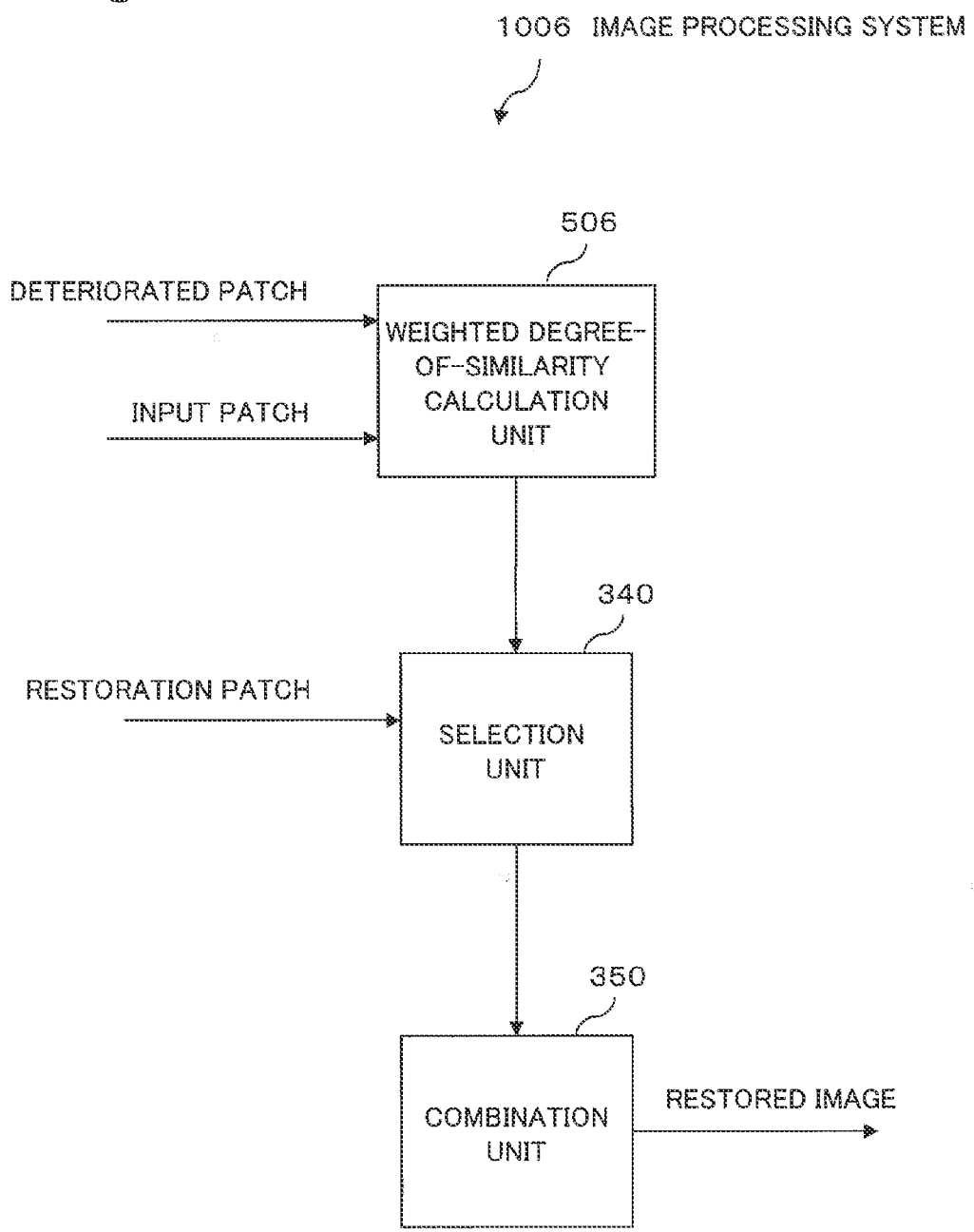
FIG. 22 is a block diagram showing a configuration of an image processing system according to a sixth exemplary embodiment.

FIG. 22 is a block diagram showing a configuration of an image processing system 1006 according to the sixth exemplary embodiment of the present invention.

Referring to FIG. 22, the image processing system 1006 in the exemplary embodiment includes a weighted degree-of-similarity calculation unit 506, the selection unit 340, and the combination unit 350.

The weighted degree-of similarity calculation unit 506 uses a dictionary (not shown in the figure) which stores a plurality of patch pairs 203, and calculates a weighted degree-of-similarity as the degree of similarity between the plural input patches 31 which are generated by dividing the input image 30 which is input, and the deteriorated patches 202. The dictionary may be, for example, the dictionary 200 shown in FIG. 1.

The patch pair 203 associates the deteriorated patch 202, which is the patch of the deteriorated image 20 obtained by deteriorating the learning image 10 which is the prescribed image, and the restoration patch 201 which is the patch of the learning image 10.

The weighted degree-of-similarity is a degree of similarity between a weighted deteriorated patch and a weighted input patch which are obtained by reconfiguring the forms of the deteriorated patch 202 and the input patch 31 respectively by use of the patch weight which is the continuous weight.

The selection unit 340 selects the restoration patch per the input patch on the basis of the weighted degree-of-similarity.

The combination unit 350 generates the restored image by combining the restoration patches each of which the selection unit 340 selects per the input patch.

Next, a component of the image processing system 1006 in a hardware unit will be described.

Figure 23:
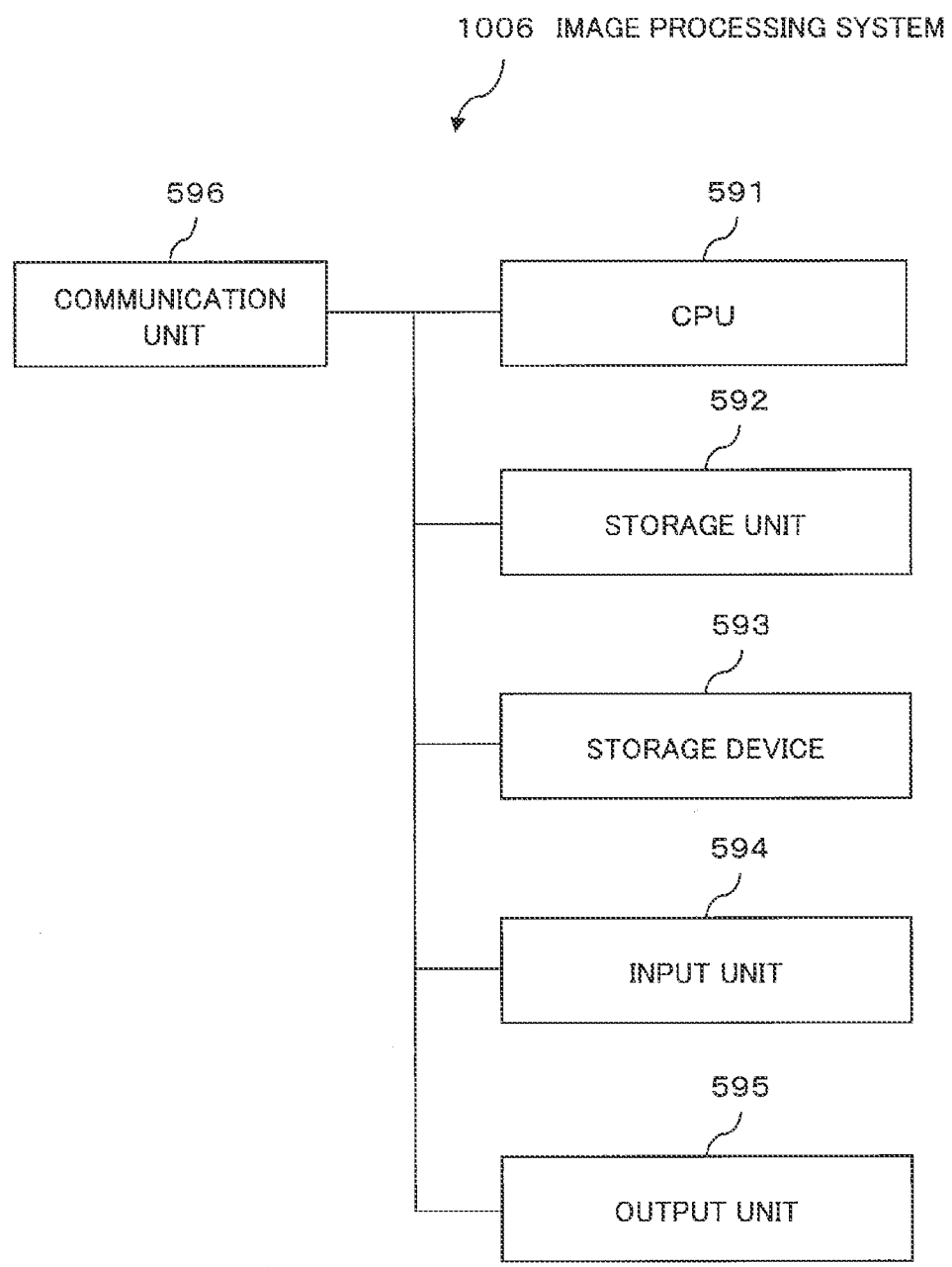
FIG. 23 is a diagram showing a hardware configuration of a computer device which realizes the image processing system according to the sixth exemplary embodiment.

FIG. 23 is a diagram showing a hardware configuration of a computer device which realizes the image processing system 1006 in the exemplary embodiment. As shown in FIG. 23, the image processing system 1006 includes CPU (Central Processing Unit) 591, a storage unit 592, a storage device 593, an input unit 594, an output unit 595 and a communication unit 596.

CPU 591 controls a whole of an operation of the image processing system 1006 by executing an operating system (not shown in the figure).

Moreover, CPU 591 reads a program (for example, a program which makes a computer execute an operation shown in the flowcharts of FIG. 5 and FIG. 14) and data from a non-volatile recording medium (not shown in the figure) which is mounted, for example, on the storage device 593. Afterward, CPU 591 writes the read program and data in the storage unit 592. Then, CPU 591 executes various processes as the weighted degree-of-similarity calculation unit 506, the selection unit 340, and the combination unit 350, which are shown in FIG. 22, according to the read program and on the basis of the read data.

Here, CPU 591 may download the program and data in the storage unit 592 from an external computer (not shown in the figure) which is connected with a communication network (not shown in the figure).

The storage unit 592 stores the program and data.

The storage device 593 is, for example, an optical disc, a flexible disc, a magnetic optical disc, an external hard disk or a semiconductor memory, and includes a non-volatile storage medium. The storage device 593 records the program so as to be computer-readable. Moreover, the storage device 593 may record the data so as to be computer-readable.

The input unit 594 is realized, for example, by a mouse, a keyboard, an internal key button, or the like, and is used for an input operation. The input unit 594 is not limited to the mouse, the keyboard, the internal key button, or the like. The input unit may be, for example, a touch panel, an accelerometer, a gyro sensor, a camera, or the like.

The output unit 595 is realized, for example, by a display, and is used for checking the output.

The communication unit 596 realizes an interface between the network and the image processing system 1006. The image processing system 1006 may be connected with the dictionary 200, for example, through the communication unit 596.

The above is the description on each component of the image processing system 1006 in the hardware unit.

As described above, a block in an unit of function unit shown in FIG. 22 is realized by a hardware configuration shown in FIG. 23. However, a means which realizes each unit of the image processing system 1006 is not limited to the above. That is, the image processing system 1006 may be realized by one apparatus which has a physical combination of a plurality of devices, or may be realized by a plurality of devices which are separated physically, and are connected each other through a wire network or a wireless network.

Figure 24:
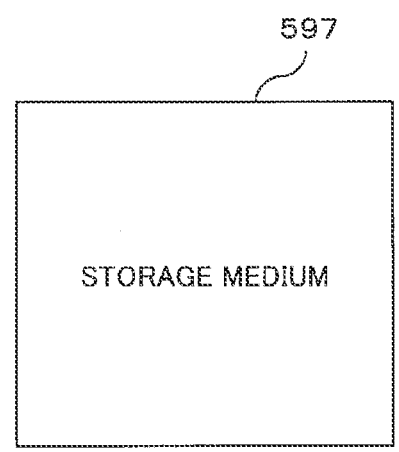
FIG. 24 is a block diagram showing an example of a nonvolatile recording medium which records a program.

FIG. 24 is a block diagram showing an example of a recording medium (or storage medium) 597 which records the program. The recording medium 597 may be a non-volatile recording medium. The recording medium 597, which records the above-mentioned program, may be supplied to the image processing system 1006, and the image processing system 1006 may read the program stored in the recording medium 597, and execute the program. That is, the exemplary embodiment of the present invention includes an exemplary embodiment of the recording medium storing the program, which the image processing system 1006 executes, transitory or non-transitory.

The exemplary embodiment mentioned above has a first effect in a point that it is possible to bring about the sufficient resemblance between the original image and the restored image which is obtained correspondingly to the low resolution input image.

The reason is that the weighted degree-of-similarity calculation unit 506 calculates the weighted degree-of-similarity, and the selection unit 340 selects the restoration patch on the basis of the weighted degree-of-similarity.

The exemplary embodiment mentioned above has a second effect in a point that it is possible to secure the easy process for realizing the first effect.

The reason is that the form of each patch is defined as the form which makes the process easy, and the degree of similarity is weighted with the patch weight whose form is identical with the form of the patch.

Hardware Configuration of Each Exemplary Embodiment

Similarly to the image processing system 1006 shown in FIG. 23, the learning device 101, the learning device 102, the learning device 104, the learning device 105, the image processing device 301, the image processing device 302, the image processing device 303 and the image processing device 305, which are described in the first to the fifth exemplary embodiments mentioned above, may be realized by a computer device including CPU and a non-volatile recording medium which stores a program. In this case, the program executed by CPU may be a program for executing each operation of the learning device 101, the learning device 102, the learning device 104, the learning device 105, the image processing device 301, the image processing device 302, the image processing device 303 and the image processing device 305 which are described in each of the exemplary embodiments mentioned above.

While the present invention has been described with reference to the exemplary embodiment, the present invention is not limited to the above-mentioned exemplary embodiment. Various changes, which a person skilled in the art can understand, can be added to the composition and the details of the invention of the present application in the scope of the invention of the present application.

This application is based upon and claims the benefit of priority from Japanese Patent Application No. 2011-271529 filed on Dec. 12, 2011, the disclosure of which is incorporated herein in its entirety by reference.

DESCRIPTION OF THE REFERENCE NUMERALS

10 learning image
20 deteriorated image
30 input image
31 input patch
40 restored image
50 patch
51 pixel group
52 pixel
53 patch identifier
70 deteriorated patch
75 position information
101 learning device
102 learning device
104 learning device
105 learning device
110 receiving unit
120 deteriorated image generation unit
130 patch pair generation unit
140 registration unit
200 dictionary
201 restoration patch
202 deteriorated patch
203 patch pair
301 image processing device
302 image processing device
303 image processing device
305 image processing device
310 receiving unit
330 patch generation unit
340 selection unit
350 combination unit
501 weighted degree-of-similarity calculation unit
502 weighted degree-of-similarity calculation unit
505 weighted degree-of-similarity calculation unit
506 weighted degree-of-similarity calculation unit
510 difference calculation unit
512 degree-of-similarity calculation unit
520 degree-of-similarity weighting unit
525 degree-of-similarity weighting unit
530 deteriorated patch weighting unit
540 input patch weighting unit
550 restoration patch weighting unit
560 patch weight determination unit
565 patch weight determination unit
591 CPU
592 storage unit
593 storage device
594 input unit
595 output unit
596 communication unit
597 recording medium
610 weighted degree-of-similarity information.
612 weighted degree-of-similarity
620 patch weight
621 weight value
641 deteriorated patch
642 input patch
643 luminance difference
644 patch weight
645 patch weight
646 patch weight
647 patch weight
648 patch weight
649 weighted difference information
651 weighted deteriorated patch
652 weighted input patch
1000 image processing system
1006 image processing system

The invention claimed is:

1. An image processing device, comprising:
a degree-of-similarity calculation unit which uses a dictionary for storing data of plural pairs associating deteriorated patches which are patches from a deteriorated image formed by deteriorating a prescribed image, and restoration patches which are patches from said prescribed image, and calculating, as a degree of similarity between plural input patches generated by dividing an input image which is input and said deteriorated patches, a weighted degree-of-similarity which is a degree-of-similarity between weighted deteriorated patches and weighted input patches in which forms of said deteriorated patches and said input patches are reconfigured using a patch weight which is continuous weight;

a selection unit which selects, on the basis of said weighted degree-of-similarity, a restoration patch for each input patch;

a combination unit which combines said restoration patches, each of which is selected for each input patch, to generate a restored image; and a degree-of-risk patch weight determination unit which determines the patch weight on the basis of a degree of risk which is calculated for each of plural patch weights and which is a ratio of a degree of similarity between said deteriorated patches to a degree of similarity between said restoration patches which are corresponding to said deteriorated patches.

2. The image processing device according to claim 1, characterized in that:

said degree-of-risk patch weight determination unit determines the patch weight for each prescribed position range on said prescribed image.

3. The image processing device according to claim 1, characterized by further comprising:

a learning patch weight determination unit which:

generates a low resolution input image from a true value image which is different from said prescribed image and which has resolution equivalent to resolution of said prescribed image;

generates an input patch from said input image;

calculates a plurality of weighted degrees-of-similarity by applying each of plural candidates for said patch weight to difference information between said input patch and said deteriorated patch which is included in said dictionary;

selects the restoration patch for each input patch on the basis of said plural weighted degrees-of similarity;

generates plural said restoration images by combining said restoration patches each of which is selected for each input patch;

calculates a difference between each of said plural restored images and said true value image; and determines the candidate for said patch weight, which is used for generating said weighted degree-of similarity which generates said restored image having the minimum said difference, as the patch weight.

4. The image processing device according to claim 3, characterized in that:

said learning patch weight determination unit determines the patch weight for each prescribed position range on said prescribed image.

5. The image processing device according to claim 1, characterized by further comprising:

a restoration patch weighting unit which generates a weighted restoration patch by weighting said restoration patch with the patch weight.

6. An image processing method which a computer executes which comprising:

using a dictionary for storing data of plural pairs associating deteriorated patches which are patches from a deteriorated image formed by deteriorating a prescribed image, and restoration patches which are patches from said prescribed image;

calculating, as a degree of similarity between plural input patches generated by dividing an input image which is input and said deteriorated patches, a weighted degree-of-similarity which is a degree-of-similarity between weighted deteriorated patches and weighted input patches in which forms of said deteriorated patches and said input patches are reconfigured using a patch weight which is continuous weight;

selecting, on the basis of said weighted degree-of-similarity, a restoration patch for each input patch;

combining said restoration patches, each of which is selected for each input patch, to generate a restored image; and determining the patch weight on the basis of a degree of risk which is calculated for each of plural patch weights and which is a ratio of a degree of similarity between said deteriorated patches to a degree of similarity between said restoration patches which are corresponding to said deteriorated patches.

7. A non-transitory computer-readable recording medium recording an image processing program which makes a computer execute:

a process of using a dictionary for storing data of plural pairs associating deteriorated patches which are patches from a deteriorated image formed by deteriorating a prescribed image, and restoration patches which are patches from the prescribed image, and calculating, as a degree of similarity between plural input patches generated by dividing an input image which is input and said deteriorated patches, a weighted degree-of-similarity which is a degree-of-similarity between weighted deteriorated patches and weighted input patches in which forms of said deteriorated patches and said input patches are reconfigured using a patch weight which is continuous weight;

a process of selecting, on the basis of said weighted degree-of-similarity, a restoration patch for each input patch;

a process of combining said restoration patches, each of which is selected for each input patch, to generate a restored image; and a process of determining the patch weight on the basis of a degree of risk which is calculated for each of plural patch weights and which is a ratio of a degree of similarity between said deteriorated patches to a degree of similarity between said restoration patches which are corresponding to said deteriorated patches.

* * * * *